(12) United States Patent
Ewing et al.

(10) Patent No.: US 8,510,424 B2
(45) Date of Patent: *Aug. 13, 2013

(54) NETWORK-CONNECTED POWER MANAGER FOR REBOOTING REMOTE COMPUTER-BASED APPLIANCES

(75) Inventors: Carrel W. Ewing, Incline Village, NV (US); Andrew J. Cleveland, Reno, NV (US); Brian P. Auclair, Reno, NV (US)

(73) Assignee: Server Technology, Inc., Reno, NV (US)

( * ) Notice: Subject to any disclaimer, the term of this patent is extended or adjusted under 35 U.S.C. 154(b) by 732 days.

This patent is subject to a terminal disclaimer.

(21) Appl. No.: 11/243,823

(22) Filed: Oct. 4, 2005

(65) Prior Publication Data
US 2006/0031454 A1    Feb. 9, 2006

Related U.S. Application Data

(63) Continuation of application No. 09/732,557, filed on Dec. 8, 2000, now Pat. No. 7,099,934.

(51) Int. Cl.
*H02B 1/04* (2006.01)
*G06F 15/173* (2006.01)

(52) U.S. Cl.
USPC ........... 709/223; 709/201; 361/601; 361/622; 713/340; 439/652; 307/11; 307/18; 307/31; 307/32; 307/36; 307/37; 307/43; 307/149

(58) Field of Classification Search
USPC ......... 713/340; 709/201, 223, 224; 361/601, 361/622; 439/652; 307/11, 18, 31, 32, 36, 307/37, 43, 149
See application file for complete search history.

(56) References Cited

U.S. PATENT DOCUMENTS

| | | | |
|---|---|---|---|
| 4,638,175 | A | 1/1987 | Bradford et al. |
| 4,644,320 | A | 2/1987 | Carr et al. |
| 4,674,031 | A | 6/1987 | Siska, Jr. |
| 4,719,364 | A | 1/1988 | Pequet et al. |
| 4,729,375 | A | 3/1988 | Jegers et al. |
| 4,769,555 | A | 9/1988 | Pequet et al. |
| 4,777,607 | A | 10/1988 | Maury et al. |
| 4,814,941 | A | 3/1989 | Speet et al. |
| 4,918,562 | A | 4/1990 | Pulizzi et al. |
| 5,424,903 | A | 6/1995 | Schreiber |
| 5,506,573 | A | 4/1996 | Ewing et al. |

(Continued)

OTHER PUBLICATIONS

IBM Technical Disclosure Bulletin, "Remote Environmental Monitor for Unattended Computer Operations", Feb. 1990, vol. 32, pp. 264-266.*

(Continued)

*Primary Examiner* — Haresh N Patel

(57) ABSTRACT

A network can comprise a power manager with a network agent in communication over a network with a network manager. The power manager can be connected to control several intelligent power modules each able to independently control the power on/off status of several network appliances. Power-on and load sensors within each intelligent power module can report the power status of each network appliance to the network manager with variables in response to commands. Each intelligent power module can be equipped with an output that is connected to cause an interrupt signal to the network appliance being controlled. The network manager can test which network appliance is actually responding before any cycling of the power to the corresponding appliance is tried.

22 Claims, 3 Drawing Sheets

(56) References Cited

U.S. PATENT DOCUMENTS

| | | | |
|---|---|---|---|
| 5,534,734 | A | 7/1996 | Pugh et al. |
| 5,563,455 | A | 10/1996 | Cheng |
| 5,642,002 | A | 6/1997 | Mekanik et al. |
| 5,650,771 | A * | 7/1997 | Lee ............................. 340/656 |
| 5,736,847 | A | 4/1998 | Van Doorn et al. |
| 5,774,979 | A * | 7/1998 | Kraft ............................. 29/857 |
| 5,923,103 | A | 7/1999 | Pulizzi et al. |
| 5,949,974 | A | 9/1999 | Ewing et al. |
| 5,995,911 | A | 11/1999 | Hart |
| 6,008,805 | A | 12/1999 | Land et al. |
| 6,011,329 | A | 1/2000 | McGovern |
| 6,160,873 | A | 12/2000 | Truong et al. |
| 6,229,691 | B1 | 5/2001 | Tanzer et al. |
| 6,266,713 | B1 | 7/2001 | Karanam et al. |
| 6,381,700 | B1 | 4/2002 | Yoshida |
| 6,388,854 | B1 | 5/2002 | Berstis et al. |
| 6,408,334 | B1 | 6/2002 | Bassman et al. |
| 6,476,729 | B1 | 11/2002 | Liu |
| 6,480,964 | B1 | 11/2002 | Oh |
| 6,507,273 | B1 | 1/2003 | Chang et al. |
| 6,557,170 | B1 | 4/2003 | Wilder et al. |
| 6,628,009 | B1 | 9/2003 | Chapel |
| 6,684,343 | B1 | 1/2004 | Bouchier et al. |
| 6,711,163 | B1 | 3/2004 | Reid et al. |
| 6,711,613 | B1 | 3/2004 | Ewing et al. |
| 6,741,442 | B1 | 5/2004 | McNally et al. |
| 6,826,036 | B2 | 11/2004 | Pereira |
| 6,968,465 | B2 | 11/2005 | Freevol et al. |
| 7,010,589 | B2 | 3/2006 | Ewing et al. |
| 7,043,543 | B2 * | 5/2006 | Ewing et al. .................. 709/223 |
| 7,099,934 | B1 * | 8/2006 | Ewing et al. .................. 709/223 |
| 7,119,676 | B1 | 10/2006 | Silverstrim et al. |
| 7,141,891 | B2 | 11/2006 | McNally et al. |
| 7,162,521 | B2 | 1/2007 | Ewing et al. |
| 7,171,461 | B2 * | 1/2007 | Ewing et al. .................. 709/223 |
| 7,171,542 | B1 | 1/2007 | Alfano et al. |
| 7,349,956 | B2 | 3/2008 | Anderson et al. |
| 2002/0004913 | A1 | 1/2002 | Fung |
| 2002/0120676 | A1 | 8/2002 | Biondi et al. |
| 2005/0203987 | A1 | 9/2005 | Ewing et al. |
| 2005/0223090 | A1 | 10/2005 | Ewing et al. |
| 2006/0031453 | A1 | 2/2006 | Ewing et al. |
| 2006/0031454 | A1 | 2/2006 | Ewing et al. |
| 2006/0072531 | A1 | 4/2006 | Ewing et al. |
| 2006/0186739 | A1 | 8/2006 | Grolnic et al. |
| 2006/0259538 | A1 | 11/2006 | Ewing et al. |
| 2007/0016664 | A1 | 1/2007 | Ewing et al. |
| 2007/0050443 | A1 | 3/2007 | Ewing et al. |
| 2007/0130243 | A1 | 6/2007 | Ewing et al. |
| 2007/0136453 | A1 | 6/2007 | Ewing et al. |
| 2007/0140238 | A1 | 6/2007 | Ewing et al. |
| 2007/0288558 | A1 * | 12/2007 | Land et al. .................... 709/203 |

OTHER PUBLICATIONS

"TPC 4000/MTD: World's First 1U, 3∅, 16A or 32A Distribution Unit," Pulizzi Engineering Inc., 2 pp. (1999).
"PC 5585: Voltage Selectable for 120V~ or 240V~, 1∅, 50/60 Hz Up to 30A," Pulizzi Engineering Inc., 3 pp. (1999).
"Complaint for Patent Infringement," *Server Technology, Inc. v. American Power Conversion Corporation*, Case No. 3:06-CV-, 58 pp. (Dec. 18, 2006).
"First Amended Complaint for Patent Infringement," *Server Technology, Inc. v. American Power Conversion Corporation*, Case No. 3:06-CV-00698-LRH-VPC, 83 pp. (Feb. 20, 2007).
"Defendant's Answer and Affirmative Defenses to Plaintiff's Complaint for Patent Infringement; Counterclaims for Declaratory Judgment of Patent Noninfringement and Patent Invalidity; and Patent Infringement," Case No. 3:06-CV-00698-LRH-(VPC), 37 pp. (Apr. 2, 2007).
"Defendant's First Amended Answer and Affirmative Defenses to Plaintiff's Complaint for Patent Infringement; Counterclaims for Declaratory Judgment of Patent Noninfringement and Patent Invalidity; and Patent Infringement," Case No. 3:06-CV-00698-LRH-(VPC), 36 pp. (Apr. 13, 2007).
"Plaintiff Server Technology Inc.'s Reply to Defendant's First Amended Counterclaims for Declaratory Judgment of Patent Noninfringement and Patent Invalidity; and Patent Infringement," Case No. 3:06-CV-00698-LRH-VPC, 8 pp. (Apr. 30, 2007).
Systems Enhancement Corporation, "Power Administrator 800 User Manual," Oct. 1, 1996, Systems Enhancement Corporation, Chesterfield, MO, USA.
American Power Conversion Corporation, "MasterSwitch VM Power Distribution Unit User Guide," Dec. 1999, American Power Conversion Corporation, W. Kingston, RI, USA.
American Power Conversion Corporation, "MasterSwitch VM Power Distribution Unit Installation and Quick Start Manual," Dec. 1999, American Power Conversion Corporation, W. Kingston, RI, USA.
American Power Conversion Corporation, "PowerNet SNMP Management Information Base v3.1.0 Reference Guide," Nov. 1999, American Power Conversion Corporation, W. Kingston, RI, USA.
"Server Technology, Inc.'s Fifth Amended Disclosure of Asserted Claims and Preliminary Infringement Contentions With Exhibits," *Server Technology, Inc. v. American Power Conversion Corporation*, Case No. 3:06-CV-00698-LRH-VPC, 30 pp. (Sep. 29, 2007).
"American Power Conversion Corporation's Preliminary Invalidity Contentions," *Server Technology, Inc. v. American Power Conversion Corporation*, Case No. 3:06-CV-00698-LRH-VPC, 89 pp. (Oct. 12, 2007).
"American Power Conversion Corporation's Preliminary Claim Constructions and Extrinsic Evidence (Patent Local Rule 4-2)," *Server Technology, Inc. v. American Power Conversion Corporation*, Case No. 3:06-CV-00698-LRH-VPC, 8 pp. (Jan. 21, 2008).
Plaintiff and Counterdefendant Server Technology, Inc.'s Preliminary Claim Constructions and Extrinsic Evidence (Patent Local Rule 4-2), *Server Technology, Inc. v. American Power Conversion Corporation*, Case No. 3:06-CV-00698-LRH-VPC, 7 pp. (Jan. 29, 2008).
"Joint Claim Construction Chart and Prehearing Statement (Patent Rule 4.3)," *Server Technology, Inc. v. American Power Conversion Corporation*, Case No. 3:06-CV-00698-LRH-VPC, 77 pp. (Feb. 22, 2008).
"Plaintiff and Counterdefendant Server Technology, Inc.'s Opening Claim Construction Brief," *Server Technology, Inc. v. American Power Conversion Corporation*, Case No. 3:06-CV-00698-LRH-VPC, 206 pp. (May 19, 2008).
"American Power Conversion Corp.'s Response to Plaintiff and Counterdefendant Server Technology, Inc.'s Opening Claim Construction Brief," *Server Technology, Inc. v. American Power Conversion Corporation*, Case No. 3:06-CV-00698-LRH-VPC, 279 pp. (Jul. 25, 2008).
"Plaintiff and Counterdefendant Server Technology, Inc.'s Reply to APC's Response to STI's Opening Claim Construction Brief," *Server Technology, Inc. v. American Power Conversion Corporation*, Case No. 3:06-CV-00698-LRH-VPC, 287 pp. (Aug. 8, 2008).
"Server Technology's Proposed Order on Claim Construction," *Server Technology, Inc. v. American Power Conversion Corporation*, Case No. 3:06-CV-00698-LRH-VPC, 22 pp. (Dec. 5, 2008).
"American Power Conversion Corp.'s Proposed Order on Claim Construction," *Server Technology, Inc. v. American Power Conversion Corporation*, Case No. 3:06-CV-00698-LRH-VPC, 24 pp. (Dec. 5, 2008).
"Continuation of Server Technology's Reply to American Power Conversion Corp.'s Response to Opening Claim Construction Brief," *Server Technology, Inc. v. American Power Conversion Corporation*, Case No. 3:06-CV-00698-LRH-VPC, 94 pp. (Aug. 11, 2008).
"American Power Conversion Corporation's Response to Server Technology's Proposed Order on Claim Construction," *Server Technology, Inc. v. American Power Conversion Corporation*, Case No. 3:06-CV-00698-LRH-VPC, 24 pp. (Jan. 5, 2009).
"Server Technology's Corrected Response in Opposition to APC's Proposed Order on Claim Construction," *Server Technology, Inc. v. American Power Conversion Corporation*, Case No. 3:06-CV-00698-LRH-VPC, 23 pp. (Jan. 8, 2009).
"American Power Conversion Corporation's Reply Regarding Server Tech.'s Proposed Order on Claim Construction," *Server Technology, Inc. v. American Power Conversion Corporation*, Case No. 3:06-CV-00698-LRH-VPC, 13 pp. (Jan. 12, 2009).

"Server Technology's Reply to APC's Response to Server Technology's Proposed Order on Claim Construction," *Server Technology, Inc.* v. *American Power Conversion Corporation*, Case No. 3:06-CV-00698-LRH-VPC, 13 pp. (Jan. 12, 2009).

"American Power Conversion Corporation's Motion for Leave to File a Surreply to Server Tech.'s Reply Brief on Claim Construction," *Server Technology, Inc.* v. *American Power Conversion Corpration*, Case No. 3:06-CV-00698-LRH-VPC, 3 pp. (Jan. 22, 2009).

"Server Technology's Response in Opposition to APC's Motion to File a Surreply to Server Technology's Reply Brief on Claim Construction," *Server Technology, Inc.* v. *American Power Conversion Corporation*, Case No. 3:06-CV-00698-LRH-VPC, 9 pp. (Feb. 7, 2009).

"Server Technology's Response in Opposition to APC's Proposed Order on Claim Construction," *Server Technology, Inc.* v. *American Power Conversion Corporation*, Case No. 3:06-CV-00698-LRH-VPC, 23 pp. (Jan. 6, 2009).

"American Power Conversion Corporation's Surreply to Server Tech.'s Reply Brief on Claim Construction," *Server Technology, Inc.* v. *American Power Conversion Corporation*, Case No. 3:06-CV-00698-LRH-VPC, 5 pp. (Jan. 22, 2009).

"Claim Construction Order," *Server Technology, Inc.* v. *American Power Conversion Corporation*, Case No. 3:06-CV-00698-LRH-VPC, 41 pp. (Apr. 19, 2010).

"Server Technology, Inc.'s Motion for Leave to File Instanter Second Amended Complaint," *Server Technology, Inc.* v. *American Power Conversion Corporation*, Case No. 3:06-CV-00698-LRH-VPC, 112 pp. (May 5, 2010).

"APC's Answer, Affirmative Defences, and Counterclaims to STI's Second Amended Complaint for Patent Infringement and Demand for Jury Trial," *Server Technology, Inc.* v. *American Power Conversion Corporation*, Case No. 3:06-CV-00698-LRH-VPC, 22 pp. (Oct. 8, 2010).

Server Technology, Inc., "Sentry Operations Remote Power Manager User's Manual (Preliminary)," 54 pp., Dec. 1999, Server Technology, Inc., Reno, NV, USA.

Server Technology, Inc., "Sentry Operations Remote Power Manager Operations Manual," 59 pp., Feb. 2000, Server Technology, Inc., Reno, NV, USA.

"APC's Motion for Summary Judgment of Non-Infringement and Invalidity," *Server Technology, Inc.* v. *American Power Conversion Corporation*, Case No. 3:06-CV-00698-LRH-VPC, 2pp. (Nov. 4, 2010).

"APC's Memorandum of Law in Support of Its Motion for Summary Judgment of Non-Infringement and Invalidity" and Exhibits 1-21; *Server Technology, Inc.* v. *American Power Conversion Corporation*, Case No. 3:06-CV-00698-LRH-VPC, 708 pp., (Nov. 4, 2010).

Detailed Request for Inter Partes Reexamination Under 35 U.S.C. §§311-318 and 37 C.F.R. §1.902 et Seq. dated Nov. 12, 2010; Reexamination Control No. 95/001,485; 60 pp.

Order Granting Request for Inter Partes Reexamination dated Jan. 15, 2011; Reexamination Control No. 95/001,485; USPTO.

Office Action dated Jan. 15, 2011; Reexamination Control No. 95/001,485; USPTO.

Office Action dated Oct. 20, 2010; U.S. Appl. No. 11/548,175; USPTO.

Office Action dated Jan. 31, 2011; U.S. Appl. No. 11/548,201; USPTO.

Office Action dated Jan. 10, 2011; U.S. Appl. No. 11/548,187; USPTO.

Office Action dated Nov. 2, 2010; U.S. Appl. No. 11/458,988; USPTO.

Office Action dated Jan. 25, 2011; U.S. Appl. No. 11/459,011; USPTO.

Office Action dated Dec. 29, 2010; U.S. Appl. No. 11/370,489; USPTO.

Office Action dated Jul. 21, 2010; U.S. Appl. No. 11/126,092; USPTO.

Office Action dated Aug. 10, 2010; U.S. Appl. No. 11/243,701; USPTO.

"APC's Amended Answer, Affirmative Defenses, and Counterclaims to STI's Second Amended Complaint for Patent Infringement; Demand for Jury Trial and Exhibits A-F," *Server Technology, Inc.* v. *American Power Conversion Corporation*, Case No. 3:06-CV-00698-LRH-VPC, 88 pp. (Jan. 18, 2011).

"Plaintiff Server Technology Inc.'s Answer to Amended Counterclaims; Jury Demand," *Server Technology, Inc.* v. *American Power Conversion Corporation*, Case No. 3:06-CV-00698-LRH-VPC, 23 pp. (Feb. 1, 2011).

"American Power Conversion Corporation's Final Invalidity Contentions and Exhibits A-D," *Server Technology, Inc.* v. *American Power Conversion Corporation*, Case No. 3:06-CV-00698-LRH-VPC, 165 pp. (Feb. 4, 2011).

Office Action dated Jun. 22, 2012; U.S. Appl. No. 12/853,193; USPTO; 11 pp.

Office Action dated May 3, 2012; U.S. Appl. No. 13/214,050; USPTO; 12 pp.

Office Action dated Mar. 13, 2012; U.S. Appl. No. 13/091,082; USPTO; 47 pp.

Office Action dated Mar. 16, 2012; U.S. Appl. No. 12/963,538; USPTO; 50 pp.

Office Action dated Apr. 18, 2012; U.S. Appl. No. 11/126,092; USPTO; 28 pp.

Office Action dated Mar. 6, 2012; U.S. Appl. No. 12/965,563; USPTO; 20 pp.

American Power Conversion Corporation; Masterswitch VM Power Distribution Unit User Guide; 1999; 51 pp.

American Power Conversion Corporation; MasterSwitch VM Power Distribution Unit Installation and Quick Start Manual; 2000; 20 pp.

American Power Conversion Corporation; PowerNet SNMP Management Information Base (MIB) v3.1.0 Reference Guide; 1999; 48 pp.

Bay Technical Associates, Inc.; download of www.BayTech.net from web.archive.org; 1997; 8 pp.

Bay Technical Associates, Inc.; Owner's Manual for BayTech Remote Power Control Unit for Models RPC-2, RPC-2A, RPC-2 MD01, RPC3-15 Amp, RPC3-20 Amp, RPC-3A, RPC-4, RPC-5, RPC-7, RPC-21; Jan. 2000; 80 pp.

M2 Communications Ltd. M2 Presswire; BayTech's vertically mounted power strip helps network managers keep equipment up and running; Nov. 19, 1999; 1 p.

Systems Enhancement Corporation; Power Administrator 800: User's Manual; 1996; 50 pp.

Office Action dated Jan. 31, 2011; U.S. Appl. No. 11/548,201; USPTO; 30 pp.

Office Action dated Mar. 29, 2012; Reexamination Control No. 95/001,485; USPTO; 103 pp.

Server Technology, Inc.; "Patent Owner's Response to Non-Final Office Action"; Reexamination Control No. 95/001,485; May 29, 2012; 56 pp.

Carrel W. Ewing; "Second Declaration of Carrel W. Ewing Under 37 CFR §1.132"; Reexamination Control No. 95/001,485; May 29, 2012; 140 pp.

Michael B. Aucoin; "Second Declaration of B. Michael Aucoin Under 37 CFR 1.132"; Reexamination Control No. 95/001,485; May 29, 2012; 58 pp.

Chris Hardin; "Second Declaration of Chris Hardin Under 37 CFR 1.132"; Reexamination Control No. 95/001,485; May 29, 2012; 9 pp.

KC Mares; "Second Declaration of KC Mares Under 37 CFR 1.132"; Reexamination Control No. 95/001,485; May 29, 2012; 5 pp.

Michael R. Henson; "Declaration of Michael R. Henson Under 37 CFR §1.132"; Reexamination Control No. 95/001,485; May 29, 2012; 30 pp.

American Power Conversion Corporation; "Notice of Second Office Action in Reexamination Proceedings," *Server Technology, Inc.* v. *American Power Conversion Corporation*; Case No. 3:06-CV-00698-LRH-VPC; Apr. 10, 2012; 87 pp.

Server Technology, Inc.; "STI's Response to APC's Notice of Second Office Action in Reexamination Proceedings," *Server Technology, Inc.* v. *American Power Conversion Corporation*; Case No. 3:06-CV-00698-LRH-VPC; Apr. 18, 2012; 5 pp.

Interworking Labs Releases New, Extended SNMP Test Suite with Windows NT and Windows 95 Support, Interworking Labs, pp. 1-2, Jul. 15, 1996.*

2T-HA10F-CD 3.6 κVA Uninterruptible Power System: Operating information, Digital Equipment Corp., Order No. EK-HA10F-OP. B01, pp. 1-1 to 5-4, Aug. 1992.*

A Software managing Clustered Multi-Vender Uninteruptible Power Supply on Network, IBM Tech. Disclosure Bulletin, vol. 42, No. 419, Mar. 1, 1999.*

Touch-Pad Code-Actuated Electrical Outlet, IBM Tech. Disclosure Bulletin, vol. 33, No. 1A, 143-147, Jun. 1, 1990.*

UPS MIB, Merling Gerin—DAM Division, www.exploits.org/nut/library/protocols/snmp/mgeups.mib, pp. 1-41, Oct. 11, 1995.*

Liebert SiteNet SNMP MIBs, The Latest MIBs Available for Download, http://www.liebert.com/products/english/products/software/snmp/intro. asp?ID=921, pp. 1-2, Jul. 2, 2003.*

Newman, J., Enterprise Power Protection: Don't Get UPSet; Get the Right UPS Instead, Network Computing, vol. 7, No. 2, pp. 1-10, Feb. 15, 1996.*

"Expert Witness Report of Douglas Bors, PE" *Server Technology, Inc. v. American Power Conversion Corporation*, Case No. 3:06-CV-00698-LRH-VPC, 87 pp. (May 27, 2011).

"Expert Witness Report of Dr. Mark Horenstein Regarding Invalidity of STI's Patents" *Server Technology, Inc. v. American Power Conversion Corporation*, Case No. 3:06-CV-00698-LRH-VPC, 137 pp. (May 27, 2011).

"Expert Report of KC Mares" *Server Technology, Inc. v. American Power Conversion Corporation*, Case No. 3:06-CV-00698-LRH-VPC, 204 pp. (May 27, 2011).

"Rebuttal Expert Witness Report of Douglas Bors, PE" *Server Technology, Inc. v. American Power Conversion Corporation*, Case No. 3:06-CV-00698-LRH-VPC, 19 pp. (Jun. 29, 2011).

"Expert Report of B. Michael Aucoin, D. Engr., PE, PMP Consolidated Rebuttal of APC's Expert Invalidity Reports" *Server Technology, Inc. v. American Power Conversion Corporation*, Case No. 3:06-CV-00698-LRH-VPC, 152 pp. (Jun. 29, 2011).

"Expert Report of KC Mares (In Rebuttal to APC's Invalidity Reports)" *Server Technology, Inc. v. American Power Conversion Corporation*, Case No. 3:06-CV-00698-LRH-VPC, 33 pp. (Jun. 29, 2011).

"American Power Conversion Motion for Summary Judgment" *Server Technology, Inc. v. American Power Conversion Corporation*; Case No. 3:06-cv-00698-LRH-VPC; 4 pp.; Aug. 30, 2011.

"APC's Memorandum of Law in Support of Its Motion for Summary Judgment and Exhibits" *Server Technology, Inc. v. American Power Conversion Corporation*; Case No. 3:06-cv-00698-LRH-VPC; 75 pp.; Aug. 30, 2011.

"STI's Response to APC's Motion for Summary Judgment" *Server Technology, Inc. v. American Power Conversion Corporation*; Case No. 3:06-cv-00698-LRH-VPC; 85 pp.; Sep. 26, 2011.

"APC's Reply in Support of Summary Judgment and Exhibits" *Server Technology, Inc. v. American Power Conversion Corporation*; Case No. 3:06-cv-00698-LRH-VPC; 90 pp.; Oct. 14, 2011.

"Patent Owner's Revised Response to Non-Final Office Action, and Exhibits," Reexamination Control No. 95/001,485; 615 pp.; Jun. 20, 2011.

"Requestor's Revised Comments on Office Action of Jan. 15, 2011 and Patent Owner's Revised Response, and Exhibits," Reexamination Control No. 95/001,485; 380 pp.; Sep. 29, 2011.

Betty Yuan, "Remote Control Equals Power," Teleconnect, Feb. 2000, pp. 60-66, New York, NY USA.

Office Action dated Jun. 10, 2010; U.S. Appl. No. 11/125,963; USPTO.

Office Action dated Dec. 22, 2011; U.S. Appl. No. 11/126,092; USPTO.

Office Action dated Oct. 13, 2011; U.S. Appl. No. 11/459,011; USPTO.

Office Action dated Oct. 13, 2011; U.S. Appl. No. 11/548,187; USPTO.

Office Action dated Jun. 8, 2010; U.S. Appl. No. 11/738,417; USPTO.

Office Action dated Nov. 28, 2011; U.S. Appl. No. 12/853,193; USPTO.

Office Action dated Feb. 1, 2011; U.S. Appl. No. 12/763,137; USPTO.

\* cited by examiner

NETWORK-CONNECTED POWER MANAGER FOR REBOOTING REMOTE COMPUTER-BASED APPLIANCES

CO-PENDING APPLICATIONS

This Application is a continuation of U.S. patent application Ser. No. 09/732,557, filed Dec. 8, 2000, issued as U.S. Pat. No. 7,099,934, on Aug. 29, 2006 and titled NETWORK-CONNECTED POWER MANAGER FOR REBOOTING REMOTE COMPUTER-BASED APPLIANCES.

BACKGROUND INVENTION

1. Field

The technical field relates generally to automatic power control and more particularly to remote control methods and devices to reboot computer-based appliances that have frozen, locked-up, crashed, or otherwise become inoperable.

2. Description of the Prior Art

Anthony Coppola describes a computer power management system in U.S. Pat. No. 4,611,289, issued Sep. 9, 1986. A uninterruptable power supply with a limited power storage is connected to supply one or more computers with operating power. A power manager implemented with a microprocessor is connected to signal the computers when power reserves are running short and a graceful shut-down should be executed. This allows data to be saved to disk for use later. The power manager also signals the computers when power conditions have been restored to normal. The computers can signal the power manager to tell it when backup power can safely be cut off.

If such computers were located at some remote site and they shut down, some other means would be necessary to find out why. And if these remote computers were to crash or lock-up due to some software fault, the power manager described by Coppola has no way to be commanded to power cycle the power to any of the computers.

By at least 1991, American Power Conversion (APC) (West Kingston, R.I.) marketed CALL-UPS, which was a telephone-actuated remote UPS turn-on accessory. The CALL-UPS was intended to work with the APC SMART-UPS to protect computers from brownouts and power outages. Such CALL-UPS connected between a remote computer's modem and the telco subscriber line outlet. When an incoming call was detected by its ring or loop current, the CALL-UPS would command the SMART-UPS to turn on. This, in turn, would cause the computer to boot-up, load application software, and take the call. The power would stay up a few minutes after the call terminated so call-backs could be handled without the reboot delay. Serial data communication only progressed after the computer booted up, loaded the application software, and finished the modem handshaking. The so-called CALL-UPS-II was introduced about February of 1994 and it enabled a locked-up LAN service to be remotely corrected by rebooting crashed devices through an out-of-band modem link.

A very similar but much earlier arrangement is described by Guido Badagnani, et al., in U.S. Pat. No. 4,051,326, issued Sep. 27, 1977. A call ring signal is used to turn on a data terminal. Once the data terminal completes its initialization, it sends a ready-to-receive signal and a data conversation can begin. Another telephone-activated power controller is described by Vincent Busam, et al., in U.S. Pat. No. 4,647,721, issued Mar. 3, 1987.

Another one like these is described by Arthur P. Ferlan, in U.S. Pat. No. 4,206,444, issued Jun. 3, 1980, and titled REMOTE POWER CONTROLLER UTILIZING COMMUNICATION LINES. The stated objective is to allow remote computers to turn off and be powered up only when needed. For example, when another computer calls in and wants service. But here encoded messages are used on dedicated telephone lines, e.g., Dataphone Service. The remote verifies who is calling, and allows access only if authorized. If authorized, the remote computer is powered up.

A kind of alarm clock was added to this basic configuration by Raymond A. Oliva, et al., their device for controlling the application of power to a computer is described in U.S. Pat. No. 4,701,946, issued Oct. 20, 1987. The alarm clock can turn the remote computer on and off according to a preset schedule.

Two of the present inventors, Carrel Ewing and Andrew Cleveland, described technology along these general lines in PCT International Publication Number WO 93/10615, published May 27, 1993. This is a system for protecting and restarting computers and peripherals at remote sites which are accessible by telephone communication. They also filed U.S. patent application Ser. No. 08/061,197, on May 13, 1993, and now abandoned, for a REMOTE POWER CONTROL SYSTEM FOR COMPUTER AND PERIPHERAL EQUIPMENT. Such specifically described power-cycling to reset a remote computer that had become hung up.

Things have changed quite a lot since then. Computer-based appliances are now required to be on all the time. Any down-time is costly. But computers being what they are, they lock up occasionally and a power-on reset is about the only way to generate a reboot. When such computer-based appliances are network servers, routers, and bridges located at telco modem-farm locations, it isn't practical to send a technician to the site to force the operating power on-off-on. Much more than a simple phone call to a dial-up number is needed too, an accidental reboot could cause serious damage to user's data and the service provider's goodwill.

Enterprise networks exist to support large world-wide organizations and depend on a combination of technologies, e.g., data communications, inter-networking equipment (frame relay controllers, asynchronous transfer mode (ATM) switches, routers, integrated services digital network (ISDN) controllers, application servers), and network management application software. Such enterprise networks can be used to support a large company's branch offices throughout the world, and, as such, these networks have become mission critical to the functioning of such organizations. Masses of information are routinely expected to be exchanged, and such information exchanges are necessary to carry on the daily business of modern organizations. For example, some international banks have thousands of branch offices placed throughout Europe, Asia and the United States that each critically depend on their ability to communicate banking transactions quickly and efficiently with one another and headquarters.

A typical enterprise network uses building blocks of router and frame relay network appliances mounted in equipment racks. Such equipment racks are distributed to remote point of presence (POP) locations in the particular network. Each equipment rack can include frame relay controllers, routers, ISDN controllers, servers and modems, etc., each of which are connected to one or more power sources. The value of POP equipment can range from $200,000 to $500,000, and the number of individual devices can exceed a thousand.

Many enterprises rely on an uninterruptable power supply (UPS) to keep their network appliances operational. Many network appliances are typically connected to a single UPS, and this sets up a problem. When an individual router locks up, the router's power cannot be individually cycled on and off externally at the UPS because it is connected to a multiple power outlet. The recovery action choices available to the network control center operator thus do not include being able to reinitialize the individual equipment through a power interruption reset. The network operator could command the UPS to power cycle, but that would reset all the other attached devices that were ostensibly operating normally and carrying other network traffic. Another option is to dispatch someone to the remote location to reset the locked-up device. Neither choice is an attractive solution.

In large organizations that have come to depend heavily on enterprise networks, there is great pressure to develop ways to control costs and thus to improve profits. Organizational down-sizing has been used throughout the corporate world to reduce non-network costs, and that usually translates to fewer technical people available in the right places to support large and complex in-house global networks. Such reduced repair staffs now rely on a combination of centralized network management tools and third-party maintenance organizations to service their remote POP sites. The costs associated with dispatching third-party maintenance technicians is very high, and the dispatch and travel delay times can humble the business operations over a wide area for what seems an eternity.

Global communication network operators, located at a few centralized network management centers, are relying more and more on automated network management applications to analyze, process, display and support their networks. An increasing number of network management software applications are being marketed that use open-system standardized protocols. Particular network application tool software is possible to report lists of the network appliances, by location, and can issue trouble lists and keep track of software versions and releases. Simple network management protocol (SNMP) applications are conventionally used to issue alarms to central management consoles when remote network appliances fail.

SNMP is conventionally used to send messages between management client nodes and agent nodes. Management information blocks (MIBs) are used for statistic counters, port status, and other information about routers and other network devices. GET and SET commands are issued from management consoles and operate on particular MIB variables for the equipment nodes. Such commands allow network management functions to be carried out between client equipment nodes and management agent nodes. The agent nodes can issue alert or TRAP messages to the management center to report special events.

SNMP is an application protocol for network management services in the internet protocol suite. SNMP has been adopted by numerous network equipment vendors as their main or secondary management interface. SNMP defines a client/server relationship, wherein the client program, a "network manager", makes virtual connections to a server program, an "SNMP agent", on a remote network device. The data base controlled by the SNMP agent is the SNMP management information base, and is a standard set of statistical and control values. SNMP and private MIBs allow the extension of standard values with values specific to a particular agent. Directives issued by the network manager client to an SNMP agent comprise SNMP variable identifiers, e.g., MIB object identifiers or MIB variables, and instructions to either GET the value for the identifier, or SET the identifier to a new value. Thus private MIB variables allow SNMP agents to be customized for specific devices, e.g., network bridges, gateways, and routers. The definitions of MIB variables being supported by particular agents are located in descriptor files, typically written in abstract syntax notation (ASN.1) format. The definitions are available to network management client programs.

SNMP-based network management systems (NMS) can be implemented with Compaq INSIGHT MANAGER, Novell NETWARE, Hewlett-Packard OPENVIEW, Castlerock SNMPC, Banyan VINES, Artisoft LANTASTIC, Microsoft WINDOWS, SunNet MANGER, IBM AS/400, etc. Specific control of an agent is traditionally afforded by hardware manufacturers by supplying MIB extensions to the standardized SNMP MIB library by way of source-text files on floppy disks or compact disks (CD's). These MIB extensions load on the NMS, and an assigned IP-address for the agent is enteredin by a user at the NMS. Connecting the agent and the NMS to a properly configured network is usually enough to establish communications and control.

In 1994, American Power Conversion (West Kingston, R.I.) marketed a combination of their SMART-UPS, POWERNET SNMP ADAPTER, MEASURE-UPS, and an SNMP-based management station. POWERNET SNMP agents were used to generate traps or alarms for attention by the management station. The SNMP agents were described as being able to supply real-time UPS status and power-quality information, e.g., UPS run-time, utility-line voltage, and UPS current load.

In 1996, American Power Conversion was marketing their MASTERSWITCH embodiment that comprises a single rack-mountable box with eight relay-controlled power outlets on the back apron. A built-in 10 Base-T networking plug allows connection to a LAN. It further includes an embedded SNMP agent responsive to the networking plug that can control individual power outlets. A Telnet agent was also included. Revisions of the MASTERSWITCH that appeared by 2000 further included a hypertext transfer protocol (HTTP) agent that can generate information and control webpages on a logged-in web browser. SNMP traps were relied on to generate unsolicited alarm inputs. Automatic IP-address assignment is provided by a Bootup process.

By at least 1998, American Power Conversion began marketing a "complete enterprise power management system". A POWERNET manager controls SMART-UPS devices over a network using SNMP. An SNMP agent is associated with each controlled SMART-UPS and a graphical user interface (GUI) on the manager allows a user to see the power status of each SMART-UPS. Shutdowns and reboots of individual SMART-UPS sites are initiated from the GUI. The POWERNET EVENT ADAPTER converts SNMP traps into events that are reported in a GUI, e.g., the TIVOLI ENTERPRISE CONSOLE (TEC). In 1998, voltage, current, temperature, and relative humidity were being reported, e.g., by MEASURE-UPS, and displayed in the POWERNET MANAGER GUI.

All such patents and patent applications mentioned herein are incorporated by reference.

SUMMARY

Briefly, a power manager embodiment of the present may comprise a network comprising a power manager with a network agent in communication over a network with a network manager. The power manager can be connected to control several intelligent power modules each able to independently control the power on/off status of several network appliances. Power-on and load sensors within each intelligent power module can report the power status of each network appliance to the network manager with variables in response to commands. Each intelligent power module can be equipped with an output that is connected to cause an interrupt signal to the network appliance being controlled. The network manager is able to test which network appliance is actually responding before any cycling of the power to the corresponding appliance is tried.

Certain embodiments may provide a system and method that can help an operator avoid the mistake of turning on or off the wrong network appliance in a busy equipment rack at a remote site.

Certain embodiments may provide a system and method for power supply status and control.

Certain embodiments may provide a system and method that can allow a network console operator to investigate the functionality of the electrical power status when a router or other network device has been detected as failing.

Certain embodiments may provide a system and method for reducing the need for enterprise network operators to dispatch third party maintenance vendors to remote equipment rooms and POP locations simply to power-cycle failed network appliances.

Certain embodiments may provide a system and method for reducing the time it takes to restore a failed network appliance and improving service levels.

Certain embodiments may provide a system and method for reducing organization losses from network downtime.

These and many other objects and advantages of the present invention will no doubt become apparent to those of ordinary skill in the art after having read the following detailed description of the preferred embodiments which are illustrated in the various drawing figures.

IN THE DRAWINGS

DETAILED DESCRIPTION OF THE PREFERRED EMBODIMENTS

Figure 1:
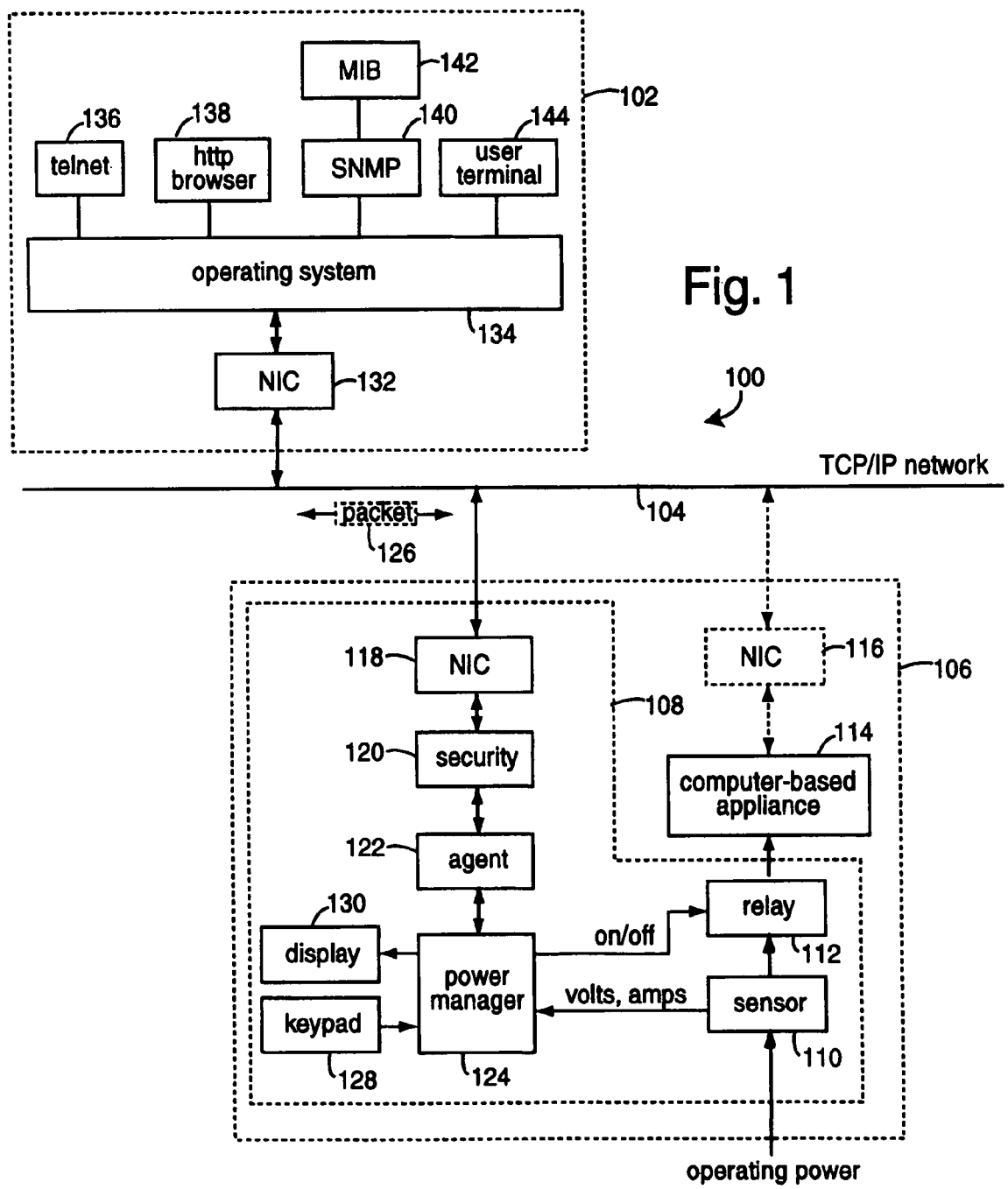
FIG. 1 is a functional block diagram of a first power manager system embodiment of the present invention.

FIG. 1 represents a power manager system embodiment of the present invention, and is referred to herein by the general reference numeral 100. A network management system (NMS) 102 is connected by a network 104 to a remote site 106. A power controller 108 forwards operating power through a sensor 110 and relay-switch 112 to a computer-based appliance 114. Such operating power can be the traditional 110VAC or 220VAC power familiar to consumers, or direct current (DC) battery power familiar to telephone central-office "plant" employees. A network interface controller (NIC) 116 may be used to connect the computer-based appliance 114 to the network 104. This would be especially true in the computer-based appliance 114 were a server, router, bridge, etc.

The problem to be solved by the power manager system 100 is the maintenance of the operating health of the computer-based appliance 114. Such computer-based appliance 114 is prone to freezing or crashing where it is effectively dead and unresponsive. It is also in some mission-critical assignment that suffers during such down time. It is therefore the role and purpose of the power manager 100 to monitor the power and environmental operating conditions in which the computer-based appliance 114 operates, and to afford management personnel the ability to turn the computer-based appliance 114 on and off. Such allows a power-on rebooting of software in the computer-based appliance 114 to be forced remotely from the NMS 102. The operating conditions and environment are preferably reported to the NMS 102 on request and when alarms occur.

The power controller 108 further includes a network interface controller (NIC) 118 connected to a security firewall 120. If the network 104 is the Internet, or otherwise insecure, it is important to provide protection of a network agent 122 from accidental and/or malicious attacks that could disrupt the operation or control of the computer-based appliance 114. The network agent 122 interfaces to a remote power manager 124, and it converts software commands communicated in the form of TCP/IP datapackets 126 into signals the remote power manager can use. For example, messages can be sent from the NMS 102 that will cause the remote power manager 124 to operate the relay-switch 112. In reverse, voltage, current, and temperature readings collected by the sensor 110 are collected by the remote power manager 124 and encoded by the network agent 122 into appropriate datapackets 126. Locally, a keyboard 128 can be used to select a variety of readouts on a display 130, and also to control the relay-switch 112.

The NMS 102 typically comprises a network interface controller (NIC) 132 connected to a computer platform and its operating system 134. Such operating system can include Microsoft WINDOWS-NT, or any other similar commercial product. This preferably supports or includes a Telnet application 136, a network browser 138, and/or a SNMP application 140 with an appropriate MIB 142. A terminal emulation program or user terminal 144 is provided so a user can manage the system 100 from a single console.

If the computer-based appliance 114 is a conventional piece of network equipment, e.g., as supplied by Cisco Systems (San Jose, Calif.), there will usually be a great deal of pre-existing SNMP management software already installed, e.g., in NMS 102 and especially in the form of SNMP 140. In such case it is preferable many times to communicate with the network agent 122 using SNMP protocols and procedures. Alternatively, the Telnet application 136 can be used to control the remote site 106.

An ordinary browser application 138 can be implemented with MSN Explorer, Microsoft Internet Explorer, or Netscape NAVIGATOR or COMMUNICATOR. The network agent 122 preferably includes the ability to send http-messages to the NMS 102 in datapackets 126. In essence, the network agent 122 would include an embedded website that exists at the IP-address of the remote site 106. An exemplary embodiment of a similar technology is represented by the MASTER-SWITCH-PLUS marketed by American Power Conversion (West Kingston, R.I.).

Figure 2:
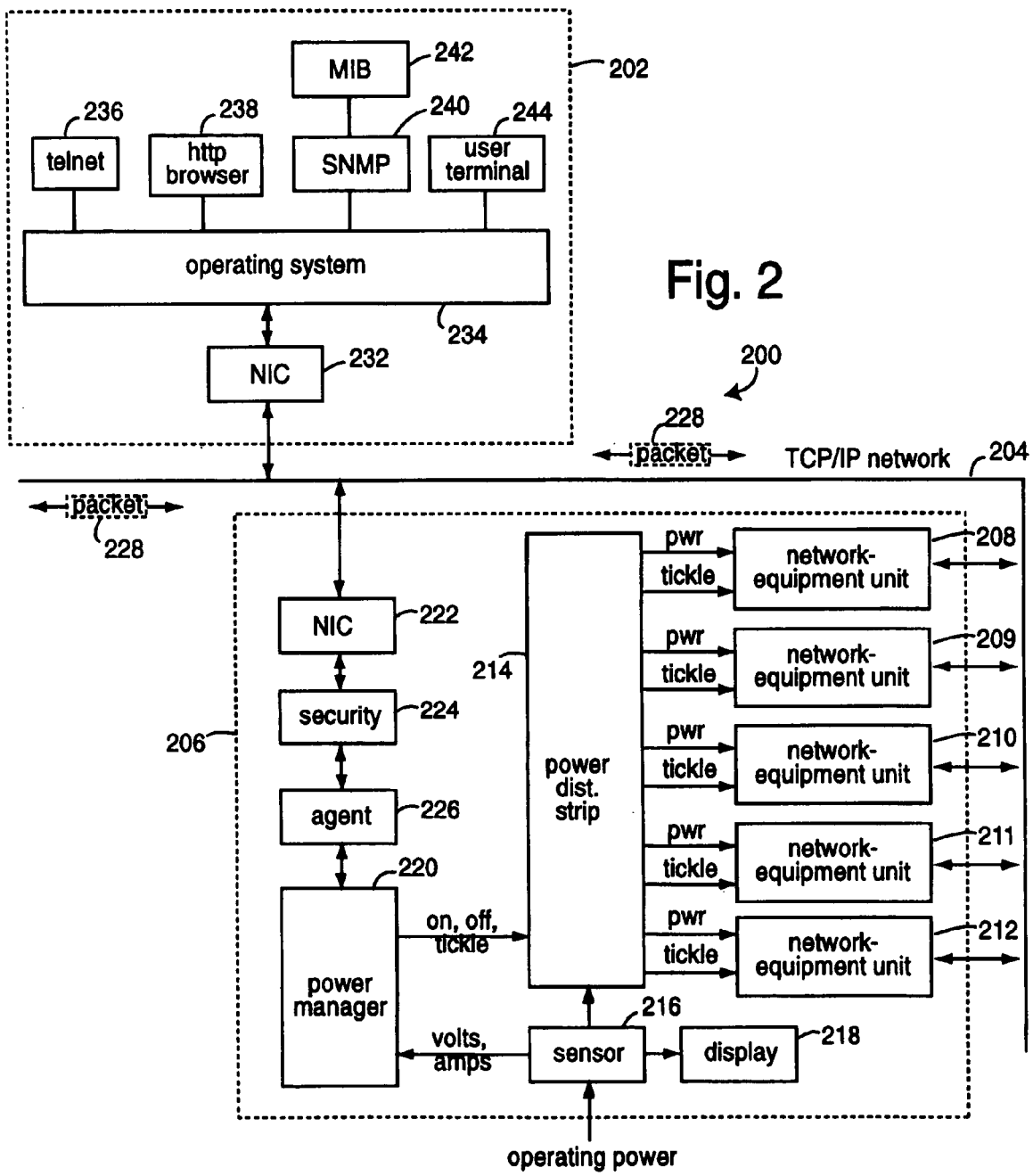
FIG. 2 is a functional block diagram of a second power manager system embodiment of the present invention.

FIG. 2 represents another power manager system embodiment of the present invention, and is referred to herein by the general reference numeral 200. A network management system (NMS) 202 like that in FIG. 1 is connected by a network 204 to an equipment rack 206. For example, such rack is an industry standard 84" tall 19" wide RETMA rack located at a modem farm or a telco office. A typical rack 206 houses a number of network routers, switches, access servers, bridges, gateways, VPN devices, etc., that all receive their operating power from the modem farm or telco office. Internet Service Providers (ISP's), telecommunication carriers, and other network service providers have installed thousands of such sites around the world. In one example, the telco operating power comes from a −48V DC battery supply, and so the use of uninterruptable power supplies (UPS) that operate on and supply AC power would make no sense. A major supplier of the network equipment contemplated here is Cisco Systems (San Jose, Calif.). The Cisco ONS15190 optical network IP-concentrator that operates on −48V DC power is typical of the kind of equipment represented in FIG. 1 by a number of network-equipment units 208-212.

The problem to be solved by the power manager system 200 is the maintenance of the operating health of the network-equipment units 208-212. When an individual one of the network-equipment units 208-212 experience a software lock-up, or crash, it is effectively dead and will not be responsive. A typical rack 206 can be responsible for supporting a major piece of the public Internet or a corporate extranet. It is therefore the role and purpose of the power manager 200 to monitor the power and environmental operating conditions, and to afford management personnel the ability to turn the computer-based network-equipment units 208-212 on and off. Such allows a power-on rebooting of software to be forced remotely from the NMS 202. The operating conditions and environment are preferably reported to the NMS 202 on request and when any alarms occur, e.g., excess temperature or load current.

Vertical space in the rack 206 is typically at a premium, so all the possible vertical rack space is reserved to the network-equipment units 208-212 and not to any power supplies or controllers. Therefore, a power-distribution strip 214 is implemented as one or two long skinny plug strips mounted vertically in the back inside corner spaces. It includes a software-controlled relay-switch for each corresponding power cord set from the network-equipment units 208-212. For example, sixteen plug outlets and relay-switches each. A sensor 216 measures the total power entering the power-distribution strip 214, and can output volts, current, or power readings to a local display 218. The sensor also provides such volts, current, or power readings, as well as ambient temperature measurements in the top and bottom of the rack 206 to a remote power manager 220.

In an alternative embodiment of the present invention, the power-distribution strip 214 associates a "tickle" signal with each power supply connection to corresponding ones of the network-equipment units 208-212. This allows a channel to be exercised and tested so a systems administrator can develop confidence that a power on-off command will not run amok and turn off an unintended device.

The equipment rack 206 further includes a network interface controller (NIC) 222 connected to a security firewall 224. If the network 204 is the Internet, or otherwise insecure, it is important to provide protection of a network agent 226 from accidental and/or malicious attacks that could disrupt the operation or control of the network-equipment units 208-212. The network agent 226 converts software commands communicated in the form of TCP/IP datapackets 228 into signals the remote power manager can use. For example, messages can be sent from the NMS 202 that will cause the remote power manager 220 to operate the power relay-switches in the power-distribution strip 214. In reverse, voltage, current, and temperature readings collected by the sensor 216 are collected by the remote power manager 220 and encoded by the network agent 226 into appropriate datapackets 228.

The NMS 202 typically comprises a network interface controller (NIC) 232 connected to a computer platform and its operating system 234. Such operating system can include Microsoft WINDOWS-NT, or any other similar commercial product. This preferably supports or includes a Telnet application 236, a network browser 238, and/or an SNMP application 240 with an appropriate MIB 242. A terminal emulation program or user terminal 244 is provided so a user can manage the system 200 from a single console.

Figure 3:
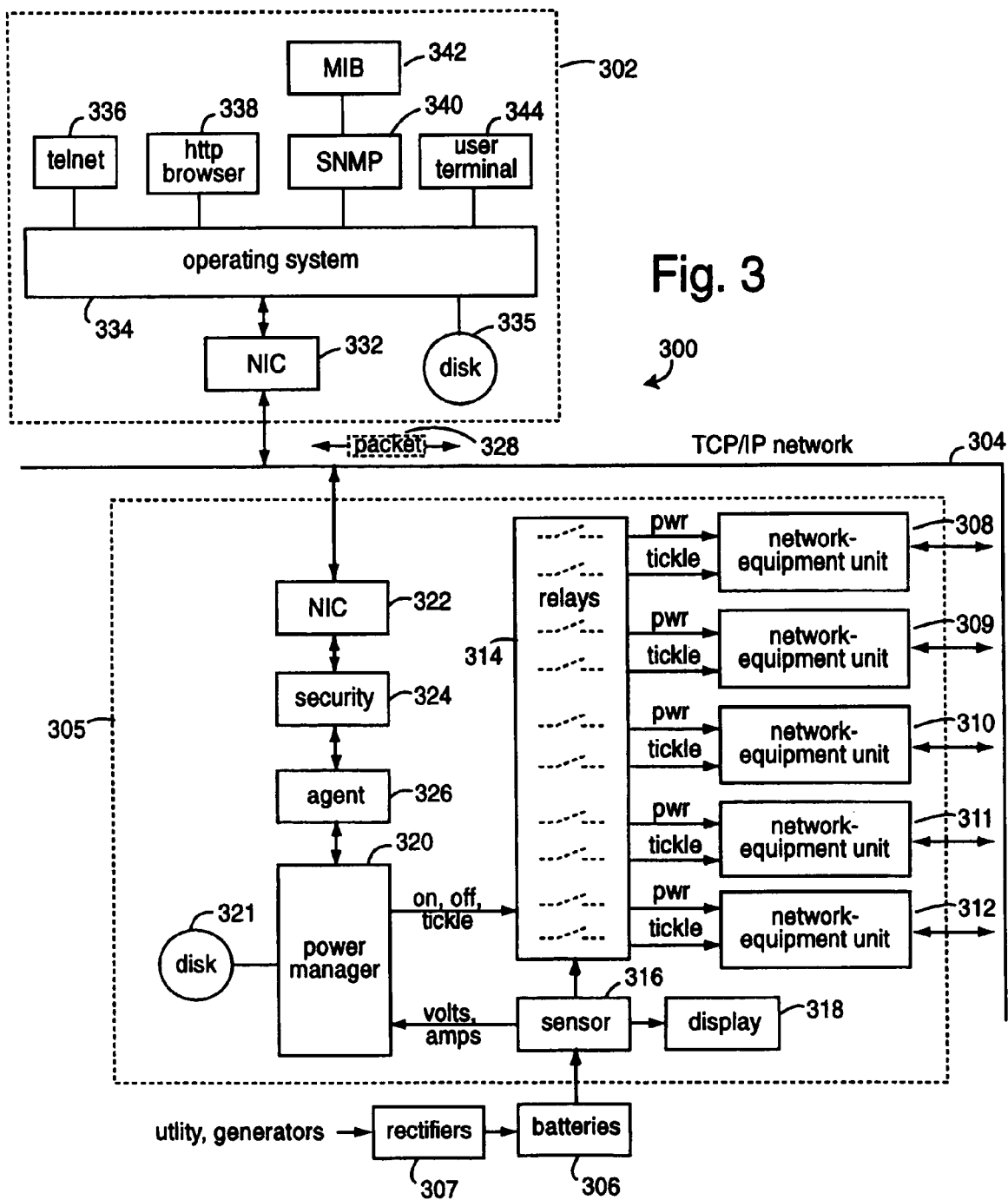
FIG. 3 is a functional block diagram of a third power manager system embodiment of the present invention.

FIG. 3 represents a third power manager system embodiment of the present invention, and is referred to herein by the general reference numeral 300. A network management system (NMS) 302 like those in FIGS. 1 and 2 is connected by a network 304 to an equipment rack 305. For example, such rack houses a number of network routers, switches, access servers, bridges, gateways, VPN devices, etc., that all receive their operating power from a battery bank 306 charged by a rectifier 307.

The problem to be solved by the power manager system 300 is the maintenance of the operating health of the network-equipment units 308-312. When an individual one of the network-equipment units 308-312 experience a software lock-up, or crash, it is effectively dead and will not be responsive. A typical rack 305 can be responsible for supporting a major piece of the public Internet or a corporate extranet. It is therefore the role and purpose of the power manager 300 to monitor the power and environmental operating conditions, and to afford management personnel the ability to turn the computer-based network-equipment units 308-312 on and off. Such allows a power-on rebooting of software to be forced remotely from the NMS 302. The operating conditions and environment are preferably reported to the NMS 302 on request and when any alarms occur, e.g., excess temperature or load current.

Vertical space in the rack 305 is typically at a premium, so all the possible vertical rack space is reserved to the network-equipment units 308-312 and not to any power supplies or controllers. Therefore, a power-distribution strip 314 is implemented as one or two long skinny plug strips mounted vertically in the back inside corner spaces. It includes a software-controlled relay-switch for each corresponding power cord set from the network-equipment units 308-312. For example, sixteen plug outlets and relay-switches each. A sensor 316 measures the total power entering the power-distribution strip 314, and can output volts, current, or power readings to a local display 318. The sensor also provides such volts, current, or power readings, as well as ambient temperature measurements in the top and bottom of the rack 305 to a remote power manager 320.

A disk 321 represents a database of user configuration information. Prior art systems required users to set all the configuration options one-by-one through Telnet, SNMP, or http commands. In large systems with many configuration choices to be made, errors and other data entry problems can develop. A model set of configurations can be published by a large user with many racks 305 to setup, all on a distribution disk 321. Alternatively, once a rack 305 has been configured, its configuration can be copied to disk 321 for downloading at the other locations.

The disk 321 can also be used to store an image that can be reloaded in the event agent 326 or remote power manager 320 crash or have to be replaced. Keeping such configuration information on disk 321 generally saves on installation time and reduces error.

In an alternative embodiment of the present invention, the power-distribution strip 314 associates a "tickle" signal with each power supply connection to corresponding ones of the network-equipment units 308-312. This allows a channel to be exercised and tested so a systems administrator can develop confidence that a power on-off command will not run amok and turn off an unintended device.

The equipment rack 305 further includes a network interface controller (NIC) 322 connected to a security firewall 324. If the network 304 is the Internet, or otherwise insecure, it is important to provide protection of a network agent 326 from accidental and/or malicious attacks that could disrupt the operation or control of the network-equipment units 308-312. The network agent 326 converts software commands communicated in the form of TCP/IP datapackets 328 into signals the remote power manager can use. For example, messages can be sent from the NMS 302 that will cause the remote power manager 320 to operate the power relay-switches in the power-distribution strip 314. In reverse, voltage, current, and temperature readings collected by the sensor 316 are collected by the remote power manager 320 and encoded by the network agent 326 into appropriate datapackets 328.

The NMS 302 typically comprises a network interface controller (NIC) 332 connected to a computer platform and its operating system 334. A disk 335 represents systems and applications software that can be loaded on the computer platform and its operating system 334 to control the network agent 326. The computer platform and its operating system 334 typically include Microsoft WINDOWS-NT, or any other similar commercial product. This preferably supports or includes a Telnet application 336, a network browser 338, and/or an SNMP application 340 with an appropriate MIB 342. A terminal emulation program or user terminal 344 is provided so a user can manage the system 300 from a single console.

Many commercial network devices provide a contact or logic-level input port that can be usurped for the "tickle" signal. Cisco Systems routers, for example, provide an input that can be supported in software to issue the necessary message and identifier to the system administrator. A device interrupt has been described here because it demands immediate system attention, but a polled input port could also be used.

Network information is generally exchanged with protocol data unit (PDU) messages, which are objects that contain variables and have both titles and values. SNMP uses five types of PDUs to monitor a network. Two deal with reading terminal data, two deal with setting terminal data, and one, the trap, is used for monitoring network events such as terminal start-ups or shut-downs. When a user wants to see if a terminal is attached to the network, for example, SNMP is used to send out a read PDU to that terminal. If the terminal is attached, a user receives back a PDU with a value "yes, the terminal is attached". If the terminal was shut off, a user would receive a packet informing them of the shutdown with a trap PDU.

In alternative embodiments of the present invention, it may be advantageous to include the power manager and intelligent power module functions internally as intrinsic components of an uninterruptable power supply (UPS). In applications where it is too late to incorporate such functionally, external plug-in assemblies are preferred such that off-the-shelf UPS systems can be used.

Once a user has installed and configured the power manager, it is necessary to establish a connection to the power manager. About any terminal or terminal emulation program can be chosen for use with the power manager.

For modem access, the communication software is launched that supports ANSI or VT100 terminal emulation to dial the phone number of the external modem attached to the power manager. When the modems connect, a user should see a "CONNECT" message. A user then presses the enter key to send a carriage return.

When setting up the power manager for the first time, the first modem call made to the power manager should be made with the dialing modem set to 9600 bits per second (BPS), which is the factory default modem data rate for the power manager. This should guarantee that the first connection will succeed, after which the power manager's modem initialization data rate can be increased with the "SET MODEM RATE" command and the dialing modem's data rate can be increased in the communication software For direct RS-232C access, a user starts any serial communication software that supports ANSI or VT100 terminal emulation. The program must configure the serial port to one of the supported data rates (38400, 19200, 9600, 4800, 2400, 1200, and 300 BPS), along with no parity, 8 data bits, and one stop bit, and must assert its Device Ready signal (DTR or DSR). A user then presses the Enter key to send a carriage return.

For Ethernet Network Connections, a user connects to the power manager by using a TELNET program and connecting to the TCP/IP address configured for the ServerTech MSS1 installed in the power manager. The power manager will automatically detect the data rate of the carriage return and send a username login prompt back to a user, starting a session. After the carriage return, a user will receive a banner that consists of the word "power manager" followed by the current power manager version string and a blank line and then a "Username:" prompt.

Regarding "power manager Version X.Xx, Username: _____", the power manager Banner will be displayed after the initial connection or after the LOGIN command. In response to the "Username:" prompt, a user enters a valid username string. A username is a character string up to 16 characters long followed by a carriage return. Usernames may not contain either spaces or the colon ":" character. Usernames are not case sensitive. A user has up to 60 seconds to enter a username string. If data is not entered with in the time limit, the session is ended with the following message: "Sorry the time is up. Try again later!"

After a user responds to the "Username:" prompt, a user will be prompted for an associated password with the "Password:" prompt.

Regarding "Password: _____", the power manager will not echo characters typed in response to the password prompt. Passwords are up to 16 characters and are case sensitive. Alphanumeric and other typeable characters (ASCII 32 to 126 decimal) may be used. The power manager will validate a username/password strings against the internal table of usernames/passwords that has been previously defined. If a user enters an invalid username string or password, the power manager will send an error message as follows: "Sorry, a username/Password a user has entered is NOT valid!". A user will then receive the "Username:" prompt again. A user will have three chances to enter a correct username/password. If a valid username/password is not specified on the third attempt, the following message will be sent: "Check the Username/Password and try again later!". The current user session will then be ended. As with a username, a user has up to 60 seconds to enter a password string. If data is not entered with in the time limit, the session is ended with the following message: "Sorry the time is up. Try again later!".

The power manager allows up to 128 usernames to be defined. The system has three built username/password pairs. The power manager supports a two-level username/password scheme. There is one system-administrative level username (ADMN), and up to 128 general-user level usernames.

A user logged in with the administrative username (ADMN) can control power and make configuration changes. A user logged in with a general username can control power. Also, while a user logged in with the administrative username can control power to all IPMs, a user logged in with a general username may be restricted to controlling power to a specific IPM or set of IPMs, as configured by the administrator.

There are three built in usernames and passwords:

| Username: admn | Password: admn |
| Username: gen1 | Password: gen1 |
| Username: gen2 | Password: gen2 |

These usernames cannot be deleted and by default all three have access to all IPMs. The "admn" username is the administrative username. These default usernames are able to view the status of all ports in the power manager chain even if they do not have access to the IPMs for turning power on and off. Newly added usernames can view the status of ports to which they have power on and off access. This means that a user logged in with any of the three default usernames can determine the number ports in a power manager by issuing the STATUS command (described later in this manual) because the status of all ports will be reported. A user logged in with a non-default username will be able to view the status of ports to which a username has power on and off access.

When logging in for the first time, the system administrator should use the default administrative username. This will allow the system administrator to configure all the options, as well as to change the default passwords. Changing the passwords is done using the "SET PASSWORD" command from the command prompt. The command as well as the other administrative commands are described in the next section.

The command prompt interface is used for both power control and configuration of some options, including adding/ deleting usernames, changing passwords and changing the modem initialization data rate. From the command prompt, power control actions can be applied to individual IPMs or to a group of IPMs.

All configuration changes made at the command prompt are saved to non-volatile RAM and are effective immediately.

Once a valid username and password has been entered, the power manager Commander displays a command prompt, "power manager: _____".

To get a display of available commands, press enter at the power manager prompt, which will show power manager commands are "CONNECT LOGIN OFF ON QUIT REBOOT RESYNC SET ADD DEL LIST SHOW STATUS VERS".

The RESYNC, SET, ADD, DEL, and LIST commands will be available when logged in with the administrative-level password. In addition the SHOW command will be available if the administrator grants SHOW privileges to a username. By default the gen1 and gen2 usernames have SHOW privileges. New usernames do not have SHOW privileges unless specifically granted by the administrator via the SET SHOW command described later in this manual.

The port name and group parameters in the OFF, ON, REBOOT, and STATUS commands are user-defined names from the Power Control Screens. Multiple IPMs or groups can be specified, each separated by a space, up to 50 characters. In addition port names may be specified as absolute port names. Preceding the port name with a period specifies an absolute port name ("."). Appending the power manager Board letter (e.g., "A" for the first board, "B" for the second board, etc. with the port number on the specific board creates the absolute port names. For example, the third port on the third power manager Board in the chain of boards would have an absolute port name of ".C3". If the chain of power manager Boards is altered for any reason, the absolute port names change. For example, if the second board in the chain is removed (perhaps it fails), and what used to be the third board is now connected to the first board (it is now the second board in the chain), then the absolute port names on the new board change from "C1, C2, C3, C4 to B1, B2, B3, B4". An absolute port name always refers to a single port on a single board.

"OFF {Port Name|Group|ALL} [{Port Name|Group}*]" turns off an individual IPM, a predefined group of IPMs, or all IPMs for which access is allowed by the current password level. For example in, "OFF Device" the OFF command returns information, "n port(s) turned off, m port(s) locked". "n" indicates the number of referenced IPMs that turned off. "m" indicates the number of referenced IPMs that are locked in their current state either by the administrator or because the current username does not have access rights to that IPM. "(n+m)" is the total number of IPMs that were referenced by the parameters.

"ON {Port Name|Group|ALL} [{Port Name|Group}*]" turns on an individual IPM, a predefined group of IPMs, or all IPMs for which access is allowed by the current password level. For example in, "ON Device", the ON command returns information, "n port(s) turned on m port(s) locked". "n" indicates the number of referenced IPMs that turned on. "m" indicates the number of referenced IPMs that are locked in their current state either by the administrator or because the current username does not have access rights to that IPM. "(n+m)" is the total number of IPMs that were referenced by the parameters.

"REBOOT {Port Name|Group|ALL} [{Port Name|Group}*]" turns off, pauses, and turns back on, an individual IPM, a predefined group of IPMs, or all IPMs for which access is allowed by the current password level. The delay before turning back on is either 15 seconds, or the Minimum-Off Time from the Power Control Screen, whichever is greater. For example in, "REBOOT Device", the REBOOT command returns information, n port(s) rebooted, m port(s) locked. "n" indicates the number of referenced IPMs that were rebooted. "m" indicates the number of referenced IPMs that are locked in their current state either by the administrator or because the current username does not have access rights to that IPM. "(n+m)" is the total number of IPMs that were referenced by the parameters.

"STATUS {Port Name|Group|ALL} [{Port Name|Group}*]" returns the status of an individual IPM, a predefined group of IPMs, or all IPMs. For the three default usernames (e.g., admn, gen1, and gen2), this command can report the status for an IPM for which power control access is not allowed. For all other usernames this command can report status for IPMs for which a username has power control access. For example in "STATUS Device", the STATUS command returns information in the form, "n port(s) on, m port(s) off". "n" indicates the number of referenced IPMs that are on. "m" indicates the number of referenced IPMs that are off. "(n+m)" is the total number of IPMs that were referenced by the parameters.

Regarding "SHOW[Page|MODEM] [CONNECT| [SWITCH|MODEM|LINK|CONSOLE|NETWORK|]", with no parameter or with a page name, this command puts the power manager Commander into the screen oriented interface mode. With no parameter specified, display starts at the Power Control Screen of the first four power modules. If a page name is specified, display starts at the Power Control Screen with that page name.

With the MODEM parameter, a page is displayed that shows the current modem data rate and the current status of the modem initialization strings.

With the CONNECT parameter, one of the five serial port names listed above must be specified. The SHOW CON- NECT command displays the current setting of DSR and CTS checking for the specified serial port name.

The SHOW command is always available to the default usernames (e.g., admn, gen1 and gen2). By default new usernames are not allowed to use the SHOW command. The administrator (e.g., admn username) may add and delete SHOW command privileges to other usernames using the SET SHOW command.

The "CONNECT(1|16|SerialPortName|IPMName|CONSOLE|MODEM|LINK|NETWORK" command attempts to make a connection to a serial device attached to one of the four pass-through ports (CONSOLE, MODEM, LINK or NETWORK) or to one of 4 side switch ports that are identified by the power manager Port Name of the IPM (IPM Name) on the board. That is, the first side switch port is identified by the Port Name of the first IPM, the second side switch port is identified by the PORT Name of the second IPM, etc. The CONNECT command can also be used to connect to 1 of 16 possible serial ports that are connected on the LINK port at the end of a chain of power managers. If the CONNECT command is entered with a single parameter which is a number from 1 to 16, the connection is attempted to one of the ports attached to the LINK port at the end of the chain.

To ease the use of the CONNECT command, an administrator can configure any of the possible serial ports that are available with names. The CONNECT command can then be used with the assigned name (e.g., the Serial Port Name parameter) to connect to the port associated with the Serial Port Name. When the CONNECT command is used with a Serial Port Name or with a number from 1 to 16 as a parameter, the IPM access restrictions do not apply. All users can use the CONNECT command to connect to any serial port that has a Serial Port Name or is accessed with a number from 1 to 16.

If the CONNECT command is entered with no parameters, a list of possible names is displayed on the screen. A user can then use the CONNECT command with one of the names displayed to attempt a serial port connection. The administrator can use the ADD, DEL, and LIST commands to set up the Serial Port Name configuration.

For all CONNECT commands, the power manager defaults to requiring that the attached device assert both Data Set Ready (DSR) and Clear To Send (CTS), in order to successfully connect. These requirements can be individually enabled and disabled with the "SET CONNECT" command. When a connection is successful, the message "Connection complete" will be displayed, at which point communication to the attached device will be transparent through the power manager.

When finished communicating to the serial device, type "!*login<CR>". The keyword "login" is not case sensitive. This disconnection character sequence returns a user to the login username prompt at which point a user may login normally to the power manager.

A disconnection will also automatically occur when CD or DSR go inactive (as caused by hanging up a modem or exiting a communications program) or when a Telnet session is disconnected.

LOGIN brings up the "Username::" prompt to allow a user to re-login under a different username. No parameters.

RESYNC ends the session and resynchronizes the chain of boards. This command should be issued after adding or removing a board from the chain if all of the chain is not accessible. This is an administrative-level command.

VERS displays the firmware version of the first power manager Commander in the chain. No parameters.

QUIT ends the session. No parameters.

Set commands are available when logged in with the administrative username (e.g., admn). To get a display of available SET commands, enter "SET" at the power manager prompt, which will show SET commands are "CONNECT LOCATION MODEM PANEL PASSWORD SHOW SCREEN TEMPH TEMPL, LOADL LOADH ENABLET DISABLET".

"SET CONNECT {SWITCH|CONSOLE|MODEM|LINK|NETWORK}, {DSRCHECK|NODSRCHECK|CTSCHECK|NOCTSCHECK}" turns on or off active signal checking when connecting to a pass-through port when using the CONNECT command. There are two required parameters with the command. The first is one of five possible serial port names. The SWITCH serial port name is for the side-switch connection. All four of the possible side-switch connections are controlled by setting the SWITCH serial port. It is not possible to set individual side-switch connections to different signal values.

DSRCHECK requires that DSR be active from the attached device to connect. NODSRCHECK ignores that state of DSR. CTSCHECK requires that CTS be active from the attached device to connect. NOCTSCHECK ignores that state of CTS. The defaults are DSRCHECK and CTSCHECK.

"SET LOCATION {Location}" sets the location description field of the Power Control Screen for the entire power manager Commander chain. This is an alternative to entering the location description on each Power Control Screen, which allows each Power Control Screen to have a unique name. With this command, spaces can be entered in the description, whereas editing the location description from the Power Control Screen does not. The location field of the first Power Control Screen is displayed as part of a "Welcome to . . . " message when a session is started. Up to 16 characters, including spaces, can be entered. Extra characters will be truncated from the location field.

Regarding "SETMODEM{RATE{NONE|300|1200|2400|4800|9600|192 00|38400}}, SET MODEM {{INIT1|INIT2|INIT2|ATTENTION|HANGUP}{DEFAULT|NONE}}", SET MODEM RATE sets the initialization data rate for the modem attached to the power manager. The data rate can be set to any of the listed speeds (300, 1200, 2400, 4800, 9600, 19200, or 38400 Bits Per Second). The NONE parameter is used to disable all modem initialization string support. The default is 9600 BPS. The initialization takes place at a user selectable data rate, with no parity, 8 data bits, and one stop bit.

SET MODEM INIT1, INIT2, INIT3, ATTENTION, or HANGUP allows an individual modem initialization string to be enabled (DEFAULT) or disabled (NONE). All default to enabled (DEFAULT).

The power manager initializes the modem when the power manager is first turned on, whenever the modem is turned on or connected and after every user session (via modem) with the power manager. During initialization, the power manager sends each of the five-fixed modem initialization strings that is enabled to the modem in the order:

Attention String: @@@
Hang-up String: ATH<CR>
Initialization String 1: AT<CR>
Initialization String 2: AT E0 Q1 S0=3 S2=64 S12=50 & C1 & D2<CR>
Initialization String 2: AT S0=1<CR>

The Attention String is sent to break from online mode to command mode if a modem is connected. The attention string can be set on most modems to match the @@@ string used by the power manager.

The Hang-up String is sent to cause the modem to hang up if there is an active connection.

Initialization String 1 is sent to alter the modem and to allow the modem time to prepare for the next command.

Initialization String 2 is sent to initialize the modem to defaults required by the power manager. The "E0" turns off the echoing of data, the "Q1" turns off result codes and the "S0=3" sets the modem to answer on the $3^{rd}$ ring.

Initialization String 3 is sent to set the modem to answer on the $1^{st}$ ring. The modem initialization features allow a choice for the modem to answer on either ring number 1 or ring number 3. The Initialization String 3 is "AT S0=1<CR>". Like the other initialization strings, Initialization String 3 defaults to being enabled, and is sent in sequence after Initialization String 2. When this happens the modem answers on ring number 1. To have the modem instead answer on ring number 3, disable Initialization String 3 with the command "SET MODEM INIT3 NONE".

For most modems, Initialization String 1 or 2 being sent by the power manager to the modem at one of the supported data rates is all that is needed for the modem to work with the power manager. This is because most modems will communicate to the attached serial device (in this case, the power manager) at the data rate of the last AT command that was sent to it. A modem that operates in this manner is operating in fixed data rate mode. Since the power manager sends the last AT command at one of its supported data rates, the modem will talk back to the power manager at that same data rate when it is on-line with another modem.

Some high-speed modems, however, can be configured to operate in variable data rate mode. With a modem set to operate in variable data rate mode, when the modems connect, the modem may change from the speed of the last AT command to a different data rate, automatically adjusting to a data rate that is best for the actual modem-to-modem connect speed. If the data rate changes to one of the supported data rates, then the power manager Commander will be able to communicate. But, if the data rate changes to a non-supported data rate, such as 14400, 28800, or faster than 38400 BPS, the power manager Commander will not be able to communicate. Thus, it is best that the modem be configured to operate in fixed data rate mode, NOT variable data rate mode.

Configuring the modem to operate in fixed data rate mode is not addressed by the modem initialization built into the power manager Commander because the command that sets the modem to use fixed data rate mode varies significantly with different modem manufacturers.

If the modems are able to connect with each other, but there is not communication with the power manager Commander, the modem attached to the power manager is probably in variable data rate mode and has switched to an unsupported speed. In this case, in the modem's manual, lookup the appropriate AT command(s) for the modem to operate in fixed data rate mode. Then attach the modem to a PC with a terminal program, send the command(s) to the modem, followed by an &W to write the new setting to the modem's memory and make it the default, and then re-attach the modem to the power manager.

"SET PANEL {NONE|DEFAULT}" changes the operational behavior of the front panel pushbuttons. NONE disables the pushbuttons. DEFAULT sets the front-panel pushbuttons to cycle through 2-states (ON and OFF) for non-Shutdown ports, and three states (ON, Shutdown, and OFF) for Shutdown ports. This is the default operating mode from the factory.

The "DEFAULT" option supports locking a port in the on or off state by pressing and holding the port's pushbutton for two seconds, at which point the LED above will flicker rapidly. If the port is on, this action will lock the port on. If the port is off, this action will lock the port off. To unlock a port, again press and hold the port's pushbutton for two seconds is a the port will stay in the same on or off state, it will be unlocked again.

When a port is locked, the power state of the port can not be changed remotely by a user. A user logged in with the "admn" username, however, can lock or unlock a port remotely from the Power Control Screen by positioning the cursor in the column of the target port, and then pressing "L" to lock or "U" to unlock the port.

Regarding "SET PASSWORD [username]", the SET PASSWORD command is used to change the password of any username. A user may specify a username for which the password is to be changed as a parameter to the SET PASSWORD command or he may enter the SET PASSWORD command with no parameters. If a user enters the SET PASSWORD command without specifying a username, the system will prompt a user for a username with the following prompt: "Username:". If a valid username is not specified either as a parameter on the SET PASSWORD command or in response to the "Username:" prompt, the following message is displayed: "Sorry, a username a user has entered is NOT valid!", and the SET PASSWORD command is terminated. If a user enters a valid username he is prompted for the new password and also for a verification of the new password. A user must specify the current password in order to change the password for the administrator username (e.g., admn). For all other usernames the password is changed without having to first specify the existing password. The password can not contain more than 16 characters or the command is aborted with the following message: "Sorry, the password a user has entered is NOT valid!". The following message is displayed when the password is changed: "Password successfully changed".

The power manager will echo the "*" character for all characters entered by a user for passwords when using the SET PASSWORD command. This includes the new password, the verification of the new password and the verification of the existing password in the case of changing the ADMN password.

Regarding "SET SHOW [username] [ON|OFF]", the SET SHOW command is used to enable or disable SHOW command access for a username. The SET SHOW command can be entered with no parameters, with a single parameter (which is a username) or with two parameters (which are username followed by "on" or "off" to indicate the SHOW command is to be enabled or disabled). If a parameter is not specified, a user is prompted first for a user name with the "Username:" message followed by a prompt for the "on" or "off" specification with the "Specify ON or OFF:" message. If a user does not specify a valid username in response to the "Username:" prompt, the command aborts with the following message: "Sorry, a username a user has entered is NOT valid!". If a user enters a single parameter, the "Specify ON or OFF:" prompt occurs. If a user specifies both a username and "on"/"off" parameters there is no prompting. The appropriate error message is issued and the command aborted if a username is invalid, regardless if the "on"/"off" value is specified as a parameter on the command line or is entered in response to a prompt. If the command completes successfully, the following message is displayed: "Show command enabled/ disabled for USERNAME". In this message, USERNAME is replaced by the specified username and either enabled or disabled is displayed depending on the action taken.

Regarding "SET SCREEN {NOCONFIRM|CONFIRM]", the SET SCREEN command is used to enable or disable a confirmation message when using the power manager full screen interface. When the CONFIRM option is set a user is prompted with an "Are the sure? (Y/"N")" message when making changes via the SHOW command screen. When the NOCONFIRM option is set changes are made immediately. This command changes the confirm option on all boards in a power manager chain.

The following SET commands are used to set parameters pertaining to SNMP traps that can be generated by power managers. Not all power manager hardware support all SNMP traps. Some of these commands use Board Name as a parameter. The Board Name is the name specified in the Page field of the SHOW command full screen interface. In addition to specifying the mnemonic name from the SHOW command page field, a user may specify an absolute Board Name by preceding the Board Name with a period ("."). Appending the power manager Board letter (e.g., "A" for the first board, "B" for the second board, etc. to the leading period creates the absolute Board Names. For example, the third power manager Board in the chain of boards would have an absolute Board Name of ".C". If the chain of power manager Boards is altered for any reason, the absolute Board Names change. For example, if the second board in the chain is removed (perhaps it fails), and what used to be the third board is now connected to the first board (it is now the second board in the chain), then the absolute Board Name on the new board changes from ".C to .B". An absolute Board Name always refers to a single port on a single board.

The "SET TEMPH. [Board Name|ALL] [value]" command is used to set the SNMP temperature trap high limit. The SET TEMPH command takes two optional parameters. The first is the Board Name. If the Board Name parameter is not specified on the command line the power manager prompts for the Board Name with the "Board:" prompt. A user may specify an absolute Board Name, a mnemonic Board Name from the SHOW command page field or the keyword ALL to cause all boards in the chain to be modified by the command.

The second parameter is the temperature limit value to be set. The value is in degrees Celsius and may be any value from 1 to 125. If the value is not specified on the command line, the power manager prompts for the value with the "Temperature:" prompt. If the value specified is not within the proper range, the following error message is displayed: "Invalid Temperature Valid range 1 to 125".

When the command completes the following message is displayed "Limit Value Set Successfully on X unit(s)/port(s) Command Completed Successfully!". The "X" in the message indicates the number of boards modified by the command.

The "SET TEMPL [Board Name|ALL] [value]" command is used to set the SNMP temperature trap low limit. The SET TEMPL command takes two optional parameters. The first is the Board Name. If the Board Name parameter is not specified on the command line the power manager prompts for the Board Name with the "Board:" prompt. A user may specify an absolute Board Name, a mnemonic Board Name from the SHOW command page field or the keyword ALL to cause all boards in the chain to be modified by the command.

The second parameter is the temperature limit value to be set. The value is in degrees Celsius and may be any value from 1 to 125. If the value is not specified on the command line, the power manager prompts for the value with the "Temperature:" prompt. If the value specified is not within the proper range, the following error message is displayed: "Invalid Temperature Valid range 1 to 125".

When the command completes the following message is displayed "Limit Value Set Successfully on X unit(s)/port(s) Command Completed Successfully!". The "X" in the message indicates the number of boards modified by the command.

The "SET LOADH [Port Name|Group|ALL] [value]" command is used to set the SNMP load sense trap high limit. The SET LOADH command takes two optional parameters. The first is the Port Name. If the Port Name parameter is not specified on the command line the power manager prompts for the Port Name with the "Port Name:" prompt.

The second parameter is the amps limit value to be set. The amps value may be any value from 1 to 60. If the value specified is not within the proper range, the following error message is displayed: "Invalid Amps Value Valid range 1 to 60".

When the command completes the following message is displayed "Limit Value Set Successfully on X unit(s)/port(s) Command Completed Successfully!". The "X" in the message indicates the number of power manager ports modified by the command.

The "SET LOADL [Port Name|Group|ALL] [value]" command is used to set the SNMP load sense trap low limit. The SET LOADL command takes two optional parameters. The first is the Port Name. If the Port Name parameter is not specified on the command line the power manager prompts for the Port Name with the "Port Name:" prompt.

The second parameter is the amps limit value to be set. The amps value may be any value from 1 to 60. If the value specified is not within the proper range, the following error message is displayed: "Invalid Amps Value Valid range 1 to 60".

When the command completes the following message is displayed "Limit Value Set Successfully on X unit(s)/port(s) Command Completed Successfully!". The "X" in the message indicates the number of power manager ports modified by the command.

The "SET EABLET {STRT|TEMP|MSTA|CSTA|LOAD} [Port Name|Board Name|Group|ALL]" command is used to enable an SNMP trap. The SET ENABLET command takes two parameters. The first is the type of trap to be enabled. There are four types of traps that are supported by the power manager, STRT is a trap generated when the power manager is started or resynchronized; TEMP is a trap generated when the power manager temperature probe senses a temperature too; MSTA is a trap generated when an IPM indicates an error (Module STAus error); and, CSTA is a trap generated when a power change occurs (Control STAus change).

LOAD is a trap generated when the load on an IPM is too. If the first parameter is not specified the command does not complete.

The second parameter is the Board Name for board wide traps (e.g., STRT and TEMP) and is the Port Name for IPM specific traps (e.g., MSTA, CSTA and LOAD). If the Board Name parameter is not specified on the command line the power manager prompts for the Boar Name with the "Board:" prompt. If the Port Name parameter is not specified on the command line the power manager prompts for the Port Name with the "Port Name:" prompt.

When the command completes the following message is displayed "Trap Enabled/disabled on X unit(s)/port(s) Command Completed Successfully!". The "X" in the message indicates the number of boards or ports for which the specified trap is enabled or disabled by the command.

The "SET DISABLET{STRT|TEMP|MSTA|CSTA|LOAD} [Port Name|Board Name|Group|ALL]" command is used to disable an SNMP trap. The SET DISABLET command takes two parameters. The first is the type of trap to be disabled. There are four types of traps that are supported by the power manager. They are:

STRT is a trap generated when the power manager is started or resynchronized.

TEMP is a trap generated when the power manager temperature probe senses a temperature too.

MSTA is a trap generated when an IPM indicates an error (Module STAus error).

CSTA is a trap generated when a power change occurs (Control STAus change).

LOAD is a trap generated when the load on an IPM is too. If the first parameter is not specified the command does not complete.

The second parameter is the Board Name for board wide traps (e.g., STRT and TEMP) and is the Port Name for IPM specific traps, e.g., MSTA, CSTA and LOAD. If the Board Name parameter is not specified on the command line the power manager prompts for the Board Name with the "Board:" prompt. If the Port Name parameter is not specified on the command line the power manager prompts for the Port Name with the "Port Name:" prompt.

When the command completes the following message is displayed "Trap Enabled/disabled on X unit(s)/port(s) Command Completed Successfully!". The "X" in the message indicates the number of boards or ports for which the specified trap is enabled or disabled by the command.

Regarding "LIST TRAP [Board Name|ALL]", the LIST TRAP command is used to list the current SNMP trap settings on one or more boards in a chain of boards. The LIST command is also used to list usernames and ports and these functions are described in a username/password administration section of this manual.

The LIST TRAP command takes a single parameter that is the name of the board to be listed. If this parameter is omitted, the power manager prompts for the board name with the "Board:" prompt. If a user specifies and absolute board name (e.g., a period "." followed by a letter), information on that specific board will be displayed. If a mnemonic name is entered, the command will display information on all boards with that board name with a "Press: "N") exet, "Q")uit:" prompt between board displays. The following is an example of the display that is returned by the LIST TRAP command,

| TRAP INFORMATION FOR UNIT: | .A | | | |
|---|---|---|---|---|
| power manager Start Up Trap: [X] | Temperature Error Trap: [X] | | | |
| Temperature High Limit: 50 Deg C. | Temperature Low Limit: 1 Deg C. | | | |
| | .A1 | .A2 | .A3 | .A4 |
| Control Status Trap | [X] | [X] | [X] | [X] |
| Module Status Trap | [X] | [ ] | [ ] | [ ] |
| Device Load Trap | [X] | [ ] | [ ] | [ ] |
| Load High Limit | 4 | 4 | 4 | 4 |
| Load Low Limit | 1 | 1 | 1 | 1 |
| Press: | "N")ext, "Q")uit: n | | | |

The display begins with a line that prints the absolute board name for the board being displayed. Then a line is displayed that indicates whether the Start Up trap (STRT) and the Temperature trap (TEMP) are active on this board. An "X" between the brackets means the trap is active. Even if the Start Up trap is active, start up traps are generated on the first board in the chain of boards.

The next line shows the current Temperature trap limits for this board. Following the temperature limits, is a four column matrix that shows which traps are enabled for which ports on this board. An "X" between the brackets corresponding to the trap and the port indicates the trap is active. Only the absolute port names are displayed. Following the enabled/disabled display for the traps, is a display of the current device load high and low limits for each of the four ports on this board. Finally, a prompt to continue with the next board or quit is displayed. When the command is complete a "Port List Complete" message is printed.

Username/password and Serial Port Name administration commands are available when logged in with the administrative username (e.g., admn). These commands are used to add/delete users, to allow/disallow access to power manager IPMs for usernames and to view the current usernames and their associated IPM access. They are also used to assign names to the various serial ports that can be accessed via the CONNECT command.

Regarding "ADD {USER|PORT|SNAME} [Username|Serial Port ID] [Port Name|Serial Port Name]", the ADD command is used to add usernames to the system, to add Serial Port Names, and to add port access to a username. The ADD command takes one required parameter and up to two optional parameters.

The first parameter is required and indicates whether a username is to be added (ADD USER) or whether port access is to be granted to a user (ADD PORT), or whether a Serial Port Name is to be added (ADD SNAME).

The ADD USER command is used to add a new username to the system. The command can be entered with a single parameter (which is the new username) or with no parameters. If a parameter is not specified, a user is prompted for a username with the following prompt: "Username:". A non-blank username that contains no more than 16 characters, and does not contain the colon ":" character, must be entered at this prompt or the command is aborted with the following message: "Sorry, a username a user has entered is NOT valid!". A username is not case sensitive.

Once a username is specified, a user is prompted for a password via the "Password:" message. A user is prompted for a verification of the newly entered password after entering the password. The verification password must match the first password entered or the command is aborted with the following message: "Sorry, the password a user has entered is NOT valid!". The "*" character is echoed in response to the characters typed for the password and the password verification strings. The password value entered at this prompt and successfully verified is stored as the password for this username and is used to validate this username during normal power manager logon processing. The password can not contain more than 16 characters or the command is aborted with the following message: "Sorry, the password a user has entered is NOT valid!". The password is case sensitive.

Once the information has been entered, a user receives the following message: "Username successfully added". Note that a value in a username is required in this command. Blank or empty responses to the password prompt and the password verification prompt are accepted as valid.

By default, a new user does not have access to any resources on the power manager Board, and cannot use the SHOW command. To allow a user to access a power module or a communications connection, the ADD PORT command must be used. To allow a user to use the SHOW command the SET SHOW command must be used.

The ADD PORT command is used to allow a username to access a port in the power manager Board chain. The specified port name gives access to both the power module and the communications port referenced by the port name. The command can be entered with no parameters, with a single parameter (which is a username) or with two parameters (which are username followed by the port name). If a parameter is not specified, a user is prompted first for a user name with the "Username:" message followed by a prompt for the port name with the following prompt: "port Name:". If a user does not specify a valid username in response to the "Username:" prompt, the command aborts with the following message: "Sorry, a username a user has entered is NOT valid!". A non-blank port name must be entered after the "Port Name:" or the command is aborted with the following message: "Sorry, the port name a user has entered is NOT valid!". The same message is produced if the power manager does not recognize the port name. If a user enters a single parameter, the port name prompt occurs. If a user specifies both a username and port name parameters there is no prompting. The appropriate error messages are issued and the command aborted if either a username or port name is invalid, regardless if the value is specified as a parameter on the command line or is entered in response to a prompt. If the command completes successfully, the following message is displayed: "Access to PORTNAME is granted to USERNAME". In this message PORTNAME is replaced by the specified port name and USERNAME is replaced by the specified username.

The PORTNAME specified in this command can be an absolute port name, a user created port name, or a group port name.

The ADD SNAME command is used to add a new name to a serial port in a power manager chain. The command can be entered with no parameters, with a single parameter (which is the serial port ID—identifies which port is to be named) or with two parameters (which are the serial port ID followed by the serial port name). If a parameter is not specified, a user is prompted first for the serial port ID with the "Serial Port ID:" message followed by a prompt for the serial port name with the following prompt: "Name:". If a user does not specify a valid serial port name in response to the "Name:" prompt, the command aborts with the following message: "The serial port name a user has entered is NOT valid!". Valid serial port names are from 1 to 16 characters with blanks not allowed.

In response to the "Serial Port ID:" prompt, a user may enter either a number from 1 to 16 (to specify one of the 16 possible ports connected at the end of the chain), or a two character pass through port identifier that begins with a letter and is followed by a number from 1 to 4. The parameter is verified to ensure the serial port exists and that the serial port is not already named. If the specified serial port is already named, it must first be deleted using the DEL command and then added.

Regarding "DEL {USER|PORT|SNAME} [Username|Serial Port NAME] [Port Name]", the DEL command is used to delete usernames from the system, to delete Serial Port Names, and to delete access to ports for a specific username. The DEL command takes one required parameter and up to two optional parameters.

The first parameter is required and indicates whether a username is to be deleted (DEL USER) or whether port access is to be removed from a user (DEL PORT), or whether a Serial Port Name is to be deleted (DEL SNAME).

The DEL USER command is used to remove a username from the system. The command can be entered with a single parameter (which is a username to remove) or with no parameters. If a parameter is not specified, a user is prompted for a username with the following prompt: "Username:". A valid system username must be entered at this prompt or the command is aborted with the following message: "Sorry, a username a user has entered is NOT valid!". This command cannot be used to remove any of the three default usernames (e.g., admn, gen1, or gen2).

When the DEL USER command completes successfully, a user receives "Username successfully deleted". A successful DEL USER command causes access to all ports for the specified user to be removed.

The DEL PORT command is used to remove access for a username to a port in the power manager Board chain. The command can be entered with no parameters, with a single parameter (which is a username) or with two parameters (which are username followed by the port name or by the keyword "ALL" to indicate access to all ports should be removed). If a parameter is not specified, a user is prompted first for a user name with the "Username:" message followed by a prompt for the port name with the following prompt: "Port Name:". If a user does not specify a valid username in response to the "Username:" prompt, the command aborts with the following message: "Sorry, a username a user has entered is NOT valid!". A valid port name must be entered after the "Port Name:" or the command is aborted with the following message: "Sorry, the port name a user has entered is NOT valid!". A user may enter the keyword "ALL" in response to the "Port Name:" prompt, in which case access to all ports for this username is removed. If a user enters a single parameter, the port name prompt occurs. If a user specifies both a username and port name parameters there is no prompting. The appropriate error messages are issued and the command aborted if either a username or port name is invalid, regardless if the value is specified as a parameter on the command line or is entered in response to a prompt. If the command completes successfully, the following message is displayed: "Access to PORTNAME is denied to USERNAME". In this message PORTNAME is replaced by the specified port name (or the keyword "ALL") and USERNAME is replaced by the specified username. Note that access for the administrator cannot be removed.

The DEL SNAME command is used to remove a serial port name. The command can be entered with no parameters, or with a single parameter (which is the serial port name). If a parameter is not specified, a user is prompted first for the serial port name with the "Name:" message. If a user does not specify a valid serial port name in response to the "Name:" prompt, the command aborts with the following message: "The serial port name a user has entered is NOT valid!".

Regarding "LIST {USER|USERS|PORT|PORTS|SNAME} [Username|Port Name]" the LIST command is used to list the current usernames active in the power manager system with their current SHOW command access and the ports to which a username has access, to list the current users allowed access to the system ports, and to list the currently defined Serial Port Names.

The LIST command can be used to list all users in the system (LIST USERS), to list a single user and all ports to which the specified user has access (LIST USER), to list all ports in the power manager chain and all users with access to all ports (LIST PORTS), and to list a single port and all users with access to that port (LIST PORT).

The LIST USER command is used to display information about a single user. This information includes a list of all ports on the system to which a user has access and whether the SHOW command is enabled or disabled for a user. The command can be entered with a single parameter (which is a username to list) or with no parameters. If a parameter is not specified, a user is prompted for a username with the following prompt: "Username:". A valid system username must be entered at this prompt or the command is aborted with the following message: "Sorry, a username a user has entered is NOT valid!".

If a valid username is specified the following message is displayed: Active Port List for Username XXXXXX Show command enabled/disabled.

In the above message XXXXXX is replaced by a username and either enabled or disabled is displayed depending on the status of the SHOW command for this username.

After the header message is displayed, a list of all ports to which a username has access is displayed. The absolute port name is displayed, followed by a user defined port name (if there is one) followed by the group name (if there is one). If the list of ports fills a screen, a user is prompted to press "N" for additional names or "Q" to end the list. The following is an example of the screen display,

| .A1 | PortA1 | GroupA1 |
|---|---|---|
| .A2 | PortA2 | GroupA1 |
| .Z4 | PortZ4 | GroupA1 |
| Press: "N")ext, "Q")uit | | |

All ports will have at least the absolute port name displayed; however a user assigned port name and the group name may or may not be present based on the configuration of the port.

The LIST USERS command is used to display a list of all the valid users on the system along with a display of whether the SHOW command is enabled or disabled for a user. If a username list fills the screen, a user is prompted to press "N" for additional names or "Q" to end the list. The following is an example of the LIST USERS display,

| admn | Show command enabled |
|---|---|
| gen1 | Show command enabled |
| gen2 | Show command enabled |
| sentry1 | Show command disabled |
| Press: "N")ext, "Q")uit | |

When all users have been listed, the following message is displayed: "Username List Complete".

The LIST PORT command is used to display a list of all users with access to a specific port on the system. The command can be entered with a single parameter (which is the port name to list) or with no parameters. If a parameter is not specified, a user is prompted for the port name with the following prompt: "Port Name:"

After a port name is specified, a list of usernames with access to the port is displayed on the screen. The port name being listed is displayed followed by a list of usernames. The port name is displayed as the absolute port name followed by a user created port name (if there is one) followed by the group port name (if there is one). The following example illustrates the first group of a specific port name display,

| .C4 | USERPORT1 | GROUPPORT1 |
|---|---|---|
| usernames: | | |
| admn | gen1 | gen2 |
| sentry1 | sentry2 | sentry3 |
| sentry4 | sentry5 | sentry6 |
| sentry7 | sentry8 | sentry9 |
| sentry10 | sentry11 | sentry12 |
| sentry13 | sentry14 | sentry15 |
| sentry16 | sentry17 | sentry18 |
| sentry19 | sentry20 | sentry21 |
| sentry22 | sentry23 | sentry24 |
| sentry25 | sentry26 | sentry27 |
| Press: "N")ext, "Q")uit | | |

When all users for a specific port have been displayed the following message is displayed: "Username List for PORT1 Complete".

A LIST PORTS command is used to display a list of all ports on the system with all users with access to each port on the system. The display is the same as for a single port name list as illustrated in the LIST PORT command above, except the "N")ext, "Q")uit prompt is displayed after the "Username List for PORT1 Complete" message is displayed rather than returning to the power manager prompt. Ports are displayed in port order starting with absolute port .A1 and ending with the forth port on the last board in the chain (unless a user specifies "Q" before the last port is listed).

When all users for all ports have been listed, the following message is displayed: "Port List Complete".

The LIST SNAM command is used to display the current serial port names and the port associated with the serial port name. The command takes no parameters. The output of the LIST SNAM command is a display of the current serial port names. Each serial port name is followed by the associated power manager port for the name. The names are displayed in groups of twenty ports. After each group of twenty ports is displayed a user is prompted to press "N" for additional names or "Q" to end the list. The following is an example of the screen with twenty serial port names displayed, three are listed here for illustration,

| TERMINALPORT | .A1 |
|---|---|
| NTSYSTEM | .B4 |
| LINKPORT | 12 |
| Press: "N")ext, "Q")uit | |

From the Power Control Screen, a user can control power and configure the power manager by simply moving around the screen using the arrow keys and pressing an action key. All configuration changes made in the Power Control Screen are saved to non-volatile RAM and are effective immediately. Not all of the power manager hardware supports all of the functions illustrated in the descriptions. If a capability is not supported, a user will see an ""N"/A" displayed in the field on the screen.

A Power Control Screen is accessed by a SHOW command from a command prompt,

| power manager: SHOW |
|---|

A SHOW command displays an ANSI power control screen, e.g., eighty characters wide by twenty-four lines,

| Power Control System (c) Server Technology, Inc. 1 of 2 | | | | |
|---|---|---|---|---|
| Location: | [ ] | | | |
| Port Name: | [ ] | [ ] | [ ] | [ ] |
| Control Status: | (x) On | (x) On | (x) On | (x) On |
| | ( ) Off | ( ) Off | ( ) Off | ( ) Off |
| Module Status: | Normal | Normal | Normal | Normal |
| Device Load: | 2.50A | 2.50A | 2.50A | 2.50A |
| Minimum-On Time: | 00:00:00 | 00:00:00 | 00:00:00 | 00:00:00 |
| Minimum-Off Time: | 00:00:00 | 00:00:00 | 00:00:00 | 00:00:00 |
| Shutdown Delay: | Disabled | Disabled | Disabled | Disabled |
| Wake-Up State: | On | On | On | On |
| Group: | [ ] | [ ] | [ ] | [ ] |
| Access: | All | All | All | All |
| Page: [ ] | Temperature: 27.0 Deg C. | | | |
| Press: | C)mnd, E)dit, "N")ext, "Q")uit, Space-Bar to Select | | | |

Power managers can support up to twenty-six boards in a chain of boards. Each board has its own set of four intelligent power modules (IPM's). The power manager has a power control screen for each of the boards in the power manager chain. Some modules have on board and therefore a single power control screen. Other have multiple boards and therefore multiple power control screens (one for each board). Each power control screen is considered a different page and each power control screen controls four IPM's. The page currently being viewed is displayed in the upper right corner of the screen, as is the total number of pages. The page currently being viewed is also indicated by the name in the page field in the lower left of the screen. A help line at the bottom indicates what key presses are available for specific functions, C) mnd puts the power manager back into Command Prompt mode at the "power manager:" prompt.
E) dit is used to edit fields enclosed by square brackets. When "E" is pressed, the cursor moves to the end of the current entry. The backspace key erases one character. Press Enter or Tab when done editing the field.
"N") ext displays the next Power Control Screen page.
P) revious displays the previous Power Control Screen page.
"Q")uit ends the current session.
S) pace-Bar to Select indicates that the space bar is used on non-editable fields to toggle between the predetermined settings. The space bar is also used on the status line to change the power state of a port to the state of the current cursor location (either On or Off). The plus and minus keys can also be used to toggle forward or backward through the predetermined settings.

A Port Name is an eight character descriptive field for the device plugged into the IPM. This field is used both as a description and as a parameter to the ON, OFF, REBOOT, and STATUS commands.

A Control Status of the IPM is shown by a character in the On or Off field. An "x" is displayed if the port is accessible remotely. An asterisk is displayed if the IPM is locked on by the administrator, or if the IPM is not accessible by the current password level.

To change the power state of an IPM, the cursor is moved to the desired state (On or Off), and the space bar is pressed. The "x" will move to the new state, indicating the power changed to that state.

A user can press "R" when in the On or Off field to reboot the port. If the port is already off, it will turn on immediately. If it is on, it will turn off, delay, then turn back on. The delay before turning back on is either 15 seconds, or the Minimum-Off Time, whichever is greater. During the reboot delay, an "r" is displayed in the Off field, indicating the port is going to reboot.

When in the On or Off field, a user logged in with the administrative password can lock or unlock a port by pressing "L" to lock, or "U" to unlock. A locked port will display an asterisk in the On or Off field, and cannot be controlled by a general user is a it can be unlocked by the administrator.

The Module Status is an informational field that displays the current status of the associated IPM as reported to the power manager. If the IPM is working correctly, this filed will display "Normal". If the power manager is unable to communicate with the associated IPM this field will display "No Rspns". If the IPM is set to "On" and the power manager detects the associated IPM is not on, this field will display "OnS Fail", e.g., for On Sense Failure. If the IPM is set to "Off" and the power manager detects the associated IPM is on, this field will display "Off Fail". Note that power managers equipped with these "ON SENSE" IPMs can be configured to generate SNMP traps when On Sense errors are detected.

The Device Load is an informational field that displays the amount of current in Amps that is flowing through the associated IPM. This field is significant if the power manager is equipped with the Server Technology "LOAD SENSE" IPMs that are capable of sensing the load going through the IPM and relaying this information to the power manager. If the power manager is not equipped with these "LOAD SENSE" IPMs this field has no meaning and ""N"/A" is displayed. This field will display the current in Amps when current is flowing. If the associated IPM is set to off and no current is flowing (this is the normal case), the field will display "Not On". Power managers equipped with "LOAD SENSE" IPMs can be configured to generate SMMP traps when load sense values fall outside a user configurable range.

The Minimum-On Time is the minimum amount of time that an IPM will stay on before it can be turned off by actions at the power manager command prompt. Manual actions in the Power Control Screen On or Off fields, however, are always immediate, ignoring this value. The default is 0.

The Minimum-Off Time is the minimum amount of time that an IPM will stay off before it can be turned on by actions at the power manager command prompt. Manual actions in the Power Control Screen On or Off fields, however, are always immediate, ignoring this value, except in the case of a reboot. This field determines the off delay time of a reboot, if greater than 15 seconds. The default is 0.

The Shutdown Delay is the amount of time the power manager will delay when a Power Off command is issued for an IPM before the IPM is actually set to the Power Off state. This delay is designed to allow a Power Off signal to be sent to an operating system on a machine that is attached to the IPM. Pressing the space bar when positioned to this field changes this value. The value can be set from "Disabled" (e.g., no delay) to a series of choices ranging up to an eight-minute delay. Please refer to the power manager Shutdown and Windows-NT UPS Service Configuration section of this manual for information on configuring automatic operating system shutdown.

The Wake-Up State is the state that the IPM will be in when controller power is turned on or when controller power is restored after a power outage. The options are ON and OFF. The default is ON.

The Group field takes an eight character group identifier. All IPMs with the same group name can be acted upon simultaneously by command line actions (ON, OFF, and REBOOT). The group field can be left blank so that an IPM is not part of a group.

The Access field allows changing the access to the associated IPM for the three default usernames. If a user is using more that the three default usernames on his system, access must be set via a username/password administration commands described earlier in this manual. With this field access can be granted to all three default usernames by setting the "ALL" value. To limit access to the admn username the field is set to "Admn". To limit access to the admn and gen1 usernames the field is set to "Gen1". To limit access to the admn and gen2 usernames the field is set to "Gen2". This field can be modified when logged in with the admn username. The admn username always has access to all IPMs. The default is All.

The Page field is an eight character identifier to describe the current screen page, as a more descriptive alternative to the page numbering in the upper-right-hand corner of the screen. This entry is used as a parameter to the SHOW command to display the Power Control Screen of a specific set of four IPMs. If page names are entered, each page MUST have a unique page name.

The temperature field displays the current temperature in degrees Celsius as detected by the temperature probe on the board if the board is equipped with a temperature probe. If the power manager is not equipped with a temperature probe, this field has no meaning and ""N"/A" is displayed.

A session can be ended from either the command prompt or the Power Control Screen,

---

From the command prompt, type QUIT and press Enter.
From the Power Control Screen, press ""Q"".

---

A session will automatically be terminated after 5 minutes of inactivity. With a modem connection, the modem will automatically be hung-up by the power manager lowering DTR to the modem, as well as sending the attention and Hang-up strings to the modem, if they have not been disabled.

A session will also automatically end when CD or DSR go inactive into the Modem port, which occurs when the modem is hung-up or the communication software is exited.

When a session is ended, a user is notified with the message, "Session ended". There is then a period of about fifteen seconds after a session is ended before another session can be started so the power manager can reinitialize the modem after a session is ended. If a modem is not used and the modem initialization strings are turned off, the time between sessions is about seven seconds.

A non-volatile RAM preferably stores all configurable power manager options, including the passwords, can be reset to factory defaults. This clears all a user-editable fields on the Power Control Screens and resets all the command-line configurable options to defaults, including the passwords.

Resetting to factory defaults can be done in two ways is a by an administrative-level command at the power manager prompt, or by a Reset button press during power up. This second method is necessary if the passwords are forgotten.

An administrative-level command reset is performed with the command, "SET CNFG ALL FACTORY". This will reset all the power manager products in a chain.

The button press during power up reset must be done on the first power manager at the beginning of a chain. The reset is performed by pressing and holding down the Reset button while turning on power with the On/Off toggle switch. Continue to hold down the Reset button for two seconds after turning on the power, then let go.

This will reset the first power controller board in the power manager at the beginning of a chain. The rest of the chain should then be reset by logging in with the administrator username (e.g., admn), and then issuing the administrative reset command shown above.

The network option of the power managers is implemented by an OEM version of the MSS1 Micro Serial Server manufactured by Lantronix. This device is enclosed within the power manager case and provides the Telnet-to-asynchronous functionality that allows the power manager to be accessed over a TCP/IP Ethernet network.

For purposes of this document, the MSS1 shall be considered part of the power manager. References will be made to the power manager as an Ethernet device, when, in actuality, it is the MSS1 inside the power manager that provides the network functionality. The MSS1 will generally be referred to as the power manager "NIC".

Before the power manager can be accessed over a network, the NIC must first be configured with an IP Address, Subnet Mask, and Default Gateway. These instructions explain how to configure the network parameters through either a Modem or Console connection.

Start a session with the power manager through either the Modem or Console port. Start this session with a data rate of 9600.

At the "power manager:" prompt, issue the command "CONNECT NETWORK". This should connect the session to the internal NIC's serial port and display the message "Connection complete".

Press enter multiple times. A version message from the NIC inside the power manager Commander should be displayed, followed by a "Login password>" prompt: ServerTech MSS1 Version STI3.6/1 (991214).

Type HELP at the "Local_1>" prompt for assistance.

Enter the following default Login password: access <Enter>.

The password is case sensitive. A "Local_1>" prompt should appear: At the "Local_1>" command prompt of the NIC, issue the command: SET PRIVILEGED <Enter>.

This will log a user in as a privileged user. A "Password>" prompt will be displayed, at which point a user must enter the following default privileged password: system <Enter>.

The password is case sensitive. When the valid password is entered the command prompt will change to "Local_1>>" (two greater than signs), indicating a user are in a privileged user mode.

From the privileged command prompt, enter the command: CHANGE IPADDRESS xxx.xxx.xxx.xxx <Enter>, where xxx.xxx.xxx.xxx is the IP address that a user want to assign to the power manager Commander. This command stores the IP address in the memory of the power manager Commander NAD.

Issue the command: SHOW SERVER <Enter>, on the screen displayed, verify the information entered in the above steps is correct. If the "TCP/IP Gateway:" entry is "(undefined)", or the "Subnet Mask:" is incorrect for the network, a user should also issue the following commands: CHANGE GATEWAY xxx.xxx.xxx.xxx <Enter>; and/or, CHANGE SUBNET MASK xxx.xxx.xxx.xxx <Enter>, where xxx.xxx.xxx.xxx is the appropriate IP address(es). Once a user has finished network configuration, issue the commands: SHOW SERVER <enter>, SHOW PORT <enter>, to verify the information entered in the above commands. When finished, issue the command: INIT DELAY 0 <enter>, to logout and re-initialize the NIC in the power manager with the new settings. Wait one minute for the NIC to re-initialize.

Break the connection to the NIC by typing the string sequence "!*LOGIN" followed by Enter. Log back into the power manager and QUIT. Additionally the connection will break when the modem is hung up, or the cable is disconnected from the Modem or Console port, or power is cycled to the power manager.

For other methods of configuring the NIC TCP/IP parameters, refer to the Lantronix web site at www.lantronix.com.

To start a power manager session via the TCP/IP NIC, a user must connect a Telnet session to the IP address of the power manager using Port 2001. This is done with the command: telnet xxx.xxx.xxx.xxx 2001 <Enter>, where xxx.xxx.xxx.xxx is the IP address that was assigned to the power manager.

Once the telnet connection is established, a user will be presented with the standard power manager Login prompt. If the "Username" prompt is not presented, press the Enter key for one second and then release. This sends a series of carriage returns that will start the power manager session.

It is possible to change the telnet port used to connect to the power manager via the NIC. By default a telnet connection to the default telnet port connects users to the NIC console. This allows users to enter commands to configure and view the settings of the NIC. To connect to the power manager, users connect to telnet port 2001. It is possible to change the telnet port to cause the default telnet port to connect to the power manager rather than to the NIC console. To change the connection for the default telnet port, a user must connect to the NIC console and use the change TELNETDEST command. The command is restricted to privileged users.

CHANGE TELNETDEST {Console|Serial} parameters specify either Console or Serial where, Console causes Telnet Port connections to connect to the NIC console.

Serial causes Telnet Port connections to connect directly to the serial port (just as if they connected to Telnet Port 2001).

If the CHANGE TELNETDEST command is used to change the default Telnet connection to the serial port and then a user wish to change the default back to the NIC console a user must connect to Telnet Port 7000. This connection results in a "#" prompt from the NIC. Respond to this prompt with the default login password (e.g., access) to begin a session with the NIC console. A user can then use the CHANGE TELNETDEST command to change the Telnet default port back to the console.

An inactivity timeout is not enforced when both connecting to a power manager and using a serial pass through port to connect to another device. The NIC inactivity timeout remains in effect. If users wish to disable or modify the NIC inactivity timeout, there are two NIC console commands available for this purpose. The first is the CHANGE INACTIVE LOGOUT command. This command is used to enable or disable the inactivity timeout. This command requires privileged user status as described previously. The format of the command is as follows: CHANGE INACTIVE LOGOUT {Enabled|Disabled}.

Use the Disabled parameter to disable the inactive logout timer. Use the Enabled parameter to enable the inactive logout timer.

To change the length of the inactive timer use the CHANGE INACTIVE TIMER command. This command requires privileged user status as described previously. The format of the command is as follows: CHANGE INACTIVE TIMER {XXs|YYYm}.

The parameter is specified either in seconds (five to sixty) or in minutes (one to one hundred twenty). For seconds add an "s" after the number. For minutes add an "m" after the number. The default value is thirty minutes.

Support for encrypted Telnet connections with the NIC is possible. Connections can be made from a Win32 PC to the NIC. Win32 connections are established, e.g., using a Lantronix-supplied Telnet application.

For Win32 to NIC encrypted logins Lantronix provides the TCPSCRAM.EXE utility program. This program allows a user on a Win32 platform to form an encrypted connection to a power manager NIC.

The target NIC must be configured with the encryption password. Use the command: CRYPT PASSWORD "xxxxxxx".

Note that the password can be up to seven alphanumeric characters and is case sensitive. After entering the encryption password, the unit must be rebooted.

To create a connection run the program TCPSCRAM.EXE. In the fields provided specify the IP address of the NIC, the Telnet port to be used for the connection, and the encryption password. Note that the password specified in the application must match the password (case sensitive) configured on the MSS itself.

The TCPSCRAM program will then form a connection to the power manager and all data passed between the PC and the power manager will be encrypted. The TCPSCRAM.EXE file is possible on the Lantronix FTP server in the ./priv/misc_tools/tcpscram directory.

Units that support encrypted connections support a key size of fifty-six bits.

For more information on the commands described in this section, and/or to view the complete MSS1 manual and support files see the Lantronix WWW page at http://www.lantronix.com.

The power manager (with the NIC option) supports the Simple Network Management Protocol (SNMP). For a complete description of the power manager SNMP support please refer to the power manager SNMP Support section of this manual. If SNMP support is required, the following section describes the commands that must be issued on the NIC (e.g., the MSS1—all commands require privileged access).

Login to the MSS1 as described in the previous section or by connecting via Telnet to the port 23 rather than port 2001. Once connected enter privileged mode as described in the previous section. The current settings can be viewed with the command: SHOW PWR-MGR.

The power manager SNMP support is enabled and disabled in the MSS1 with the command: PWR-MGR SNMP {ENABLED|DISABLED}.

The default is "DISABLED" The power manager SNMP support must be enabled for access to Sentry2 MIB objects and for the generation of all Sentry2 traps.

The power manager SNMP MSS1-to-power manager session timeout is configured with the command: PWR-MGR SNMP TIMEOUT {5 . . . 55}.

Valid entries are between 5 and 55, which represents the session timeout in seconds. The default is 15 seconds.

When the MSS1 receives a GET/SET SNMP request that requires communication to the power manager controller board(s), the MSS1 opens a serial session with the power manager, during which time other access paths (Modem, Console, Telnet) cannot establish a session with the power manager. The timeout setting controls how long the MSS1-to-power manager SNMP serial session must be inactive (no longer needed for SNMP request fulfillment) before the session is automatically closed, thus again allowing other access paths.

The power manager SNMP MSS1-to-power manager session speed is configured with the command: PWR-MGR SNMP SPEED data_rate. Valid entries are 300, 1200, 2400, 4800, 9600, 19200, and 38400.

When the MSS1 receives a GET/SET SNMP request that requires communication to the power manager controller board(s), the MSS1 opens a serial session with the power manager. During that session, the SPEED controls the serial data rate that the power manager uses for returning responses to query commands from the MSS1.

The power manager trap destination is defined in the MSS1 with the command: PWR-MGR SNMP TRAPDEST nnn.nnn.nnn.nnn, where nnn.nnn.nnn.nnn is the IP Address of the SNMP management station that will receive all traps. An entry of 0.0.0.0 clears the address, setting it to "(undefined)". The default is "(undefined)". The trap destination must be configured for traps to be generated.

The power manager trap community string is defined in the MSS with the command: PWR-MGR SNMP TRAPCOMM "string", Default="sentry-trap". The community strings can be between one and fifteen characters. By enclosing in double quotes, the case is preserved, otherwise it is converted to all uppercase. An entry of " " clears the string. All traps are sent with this trap community string. The trap community string must be configured for traps to be generated.

The power manager GET community string is defined in the MSS with the command: PWR-MGR SNMP GETCOMM "string". The community strings can be between one and fifteen characters. By enclosing in double quotes, the case is preserved, otherwise it is converted to all uppercase. An entry of " " clears the string.

GETCOMM is a string that will give access to the sentry2ChainGroup read-MIB objects. The use of this string will start a session with the power manager. Default="sentry".

The power manager SET community string is defined in the MSS with the command: PWR-MGR SNMP SETCOMM "string". The community strings can be between one and fifteen characters. By enclosing in double quotes, the case is preserved, otherwise it is converted to all uppercase. An entry of " " clears the string.

SETCOMM is a string that will give access to the sentry2ChainGroup read-MIB objects and the read-write sentry2PortPowerAction MIB object. The use of this string will start a session with the power manager. Default=" ". The SETCOMM community string must be configured for power control operations to succeed.

The power manager GET community string for extended power manager error information is defined in the MSS with the command: PWR-MGR SNMP ERRCOMM "string". The community strings can be between one and fifteen characters. By enclosing in double quotes, the case is preserved, otherwise it is converted to all uppercase. An entry of " " clears the string.

ERRCOMM is a string that will give access to the sentry2ErrorGroup read-MIB objects. The use of this string will NOT start a session with the power manager. Default="sentry-error".

None of the power manager community strings should be set to "public". This is because "public" is the fixed GET community string for the MSS1's native SNMP support for MIB I, MIB II, and RS232 MIB objects.

When finished, issue the command: SHOW PWR-MGR <enter>. To verify the settings a user has entered are correct, then issue the command: INIT DELAY 0<enter>. To logout and re-initialize the NIC in the power manager with the new settings. Wait one minute for the NIC to re-initialize.

For more information on the commands described in this section, and/or to view the complete MSS1 manual and support files see the Lantronix WWW page at http://www.lantronix.com.

If TACACS support is required, the following section describes the commands that must be issued on the NIC (e.g., the MSS1—all commands require privileged access).

Login to the MSS1 as described in the previous section or by connecting via Telnet to port 23 rather than port 2001. Once connected enter privileged mode as described in the previous section. The current settings can be viewed with the command: SHOW PWR-MGR.

The power manager TACACS support is enabled and disabled in the MSS1 by setting the TACACS IP address and defining the TACACS key. TACACS support is compatible with TACACS Plus servers. To set the TACACS Plus server IP address issue the following command: PWR-MGR TACACS SERVER nnn.nnn.nnn.nnn, where nnn.nnn.nnn.nnn is the IP Address of the TACACS PLUS server that will authenticate telenet connection to the power manager.

The power manager TACACS Plus key string is defined in the MSS with the command: PWR-MGR TACACS KEY "string". The key string should be enclosed in double quotes to ensure the case is preserved. Since the key does not echo it is important to be sure the key is specified correctly with case being significant. The key must match the key specified on the TACACS PLUS server.

Setting the TACACS KEY to any value activates TACACS PLUS authentication. Clearing the TACACS KEY by entering a null string in double quotes (e.g., " ") disables TACACS PLUS authentication.

Once a user has enabled TACACS PLUS authentication and rebooted the MSS1 a user will not be able to telnet to the power manager without successfully completing TACACS PLUS authentication. If a user enter an invalid key, a user will be unable to access the power manager without reloading the MSS1. If the TACACS PLUS server is unavailable a user will not be able to access the power manager via telnet.

When finished, a user issues the command: SHOW PWR-MGR <enter>.

To verify the settings a user has entered are correct, then issue the command: INIT DELAY 0 <enter>. To logout and re-initialize the NIC in the power manager with the new settings. Wait one minute for the NIC to re-initialize.

SecurID support is possible with the power manager NIC. The MSS1 with SecurID version string is "STI3.5/5+ (981103)". SecurID is not enabled by default. It is enabled and configured by several privileged-level MSS1 commands.

Prior to enabling SecurID, the power manager unit should be entirely configured and operational. A user must also already be familiar with how to log into the MSS1 and how to set privileged-user mode.

These instructions also assume thorough understanding of the ACE/Server configuration items and processes.

There are six configurable SecurID parameters: the primary ACE/Server IP address, the secondary (backup) ACE/Server IP address, the SecurID authentication request timeout, the maximum number of authentication request retries, the encryption method, and the SecurID port (TCP/IP socket number).

The current SecurID parameter settings can be displayed by the MSS1 privileged-level command: SHOW PWR-MGR. SecurID is enabled if either the primary or secondary ACE/Server IP Addresses is defined. This is done with the MSS1 privileged-level command: PWR-MGR SECURID {PRIMARY|SECONDARY} {ipaddress|NONE}, where ipaddress is in decimal numerical form. NONE removes the ipaddress definition. Changing an ACE/Server IP Address clears the MSS1's Node Secret. The other MSS1 SecurID commands are: PWR-MGR SECURID TIMEOUT n, where n is the number of seconds between authentication request retries. Default=3.

PWR-MGR SECURID MAXRETRY n, where n is the maximum number of authentication request retries. Default=5.

PWR-MGR SECURID ENCRYPTION {SID|DES}, where SID or DES selects the encryption method. Default=DES. This must match the client configuration on the ACE/Server. new ACE/Server versions renamed the SID encryption to SDI.

PWR-MGR SECURID PORT nnnnn, where nnnnn is the SecurID authentication socket number. Default=5500. This must match the port configured on the ACE/Server.

PWR-MGR SECURID FACTORY resets all the SecurID configuration parameters to their factory defaults.

In the ACE/Server Database Administration, create and configure an MSS1 client, selecting "Communication Server" as the Client Type. The MSS1 can do multiple transactions and therefore can display the Next Tokencode and New PIN prompts.

When SecurID is enabled, the standard MSS1 password protection is redundant, and a user will probably want to turn it off. A user can leave it on if a user want, in which case a user will first be prompted for the MSS1 login password, and then, after a successful entry, will be prompted for the SecurID username/passcode. To turn off the standard MSS1 password protection, use the privileged-level MSS1 commands, CHANGE PASSWORD PROTECT DISABLED
CHANGE INCOMING NOPASSWORD
CHANGE PASSWORD INCOMING DISABLED Security Enabling SecurID does not affect power manager SNMP support for controlling power. power manager SNMP support defaults to DISABLED, so it is an issue if it is enabled. The "SHOW PWR-MGR" command will display the current power manager SNMP status.

The power manager NIC supports two passwords—a Privileged password and a Login password. The Privileged password is used to become the privileged user (administrator), which is required to change settings of the NIC. This password was used in the previous two procedures with the SET PRIV command. The NIC defaults to not using the Login password, but can be configured to require the Login password when logging on (before entering a user name) and/or to establish a Telnet session using Port 2001 to begin a power control session with the power manager.

The default Privileged password is "system", which is changed with the CHANGE PRIVPASS command. The default Login password is "access", which is changed with the CHANGE LOGINPASS command. Both passwords can be made up of up to six case-sensitive alphanumeric characters. Changing either password requires privileged user status.

To configure the NIC to require the Login password when logging in, use the CHANGE INCOMING PASSWORD command. To not require the Login password when logging in, use the CHANGE INCOMING NOPASSWORD command.

To configure the NIC to require the Login password when starting a Telnet session to port 2001, use the CHANGE PASSWORD INCOMING ENABLED command. To configure the NIC to not require the Login password when starting a Telnet session to port 2001, use the CHANGE PASSWORD INCOMING DISABLED command.

The power manager NIC also supports an IP Security option that a user may wish to implement. IP security allows the system administrator to restrict incoming and outgoing TCP/IP sessions and access to the serial port. Connections are allowed or denied based upon the source IP address for incoming connections and the destination IP address for outgoing connections.

IP security information can be added to the IP local host table using the CHANGE IPSECURITY command. Specify an address in standard numeric format. An address with 0 or 255 in any segment restricts all addresses in that range.

To add an entry, specify an IP address and whether to allow or deny connections. The following exemplary command disables connections for all addresses between 192.0.1.1 and 192.0.1.254.

The following example disables the address 192.0.220.77: CHANGE IPSECURITY 192.0.220.77 DISABLED.

The CHANGE IPSECURITY command requires privileged user status.

In order to view the host table entries, the user must enter a SHOW IPSECURITY command. To remove an entry, the DELETE IPSECURITY command is followed by the IP address that the user wants to remove.

The power manager (with the network option) supports the Simple Network Management Protocol (SNMP). This allows a network management system to use SNMP "get" and "set" requests to retrieve information about, and control power to, the individual ports on the power manager. Properly implemented and integrated, this feature could allow a network management system to automatically reboot a network device that it has detected to be down or locked-up.

The ServerTech MSS1 includes an SNMP v1 agent that supports the standard MIB I, MIB II, and RS-232 MIB objects. Additionally, the ServerTech MSS1 and the power manager together support a private enterprise MIB extension that provides remote power control via SNMP. This collection of private enterprise MIB objects is called the power manager MIB.

The power manager MIB defines objects that allow a network manager to check the value of power manager configuration items, to check the power status of individual ports on the power manager, and to control power to the individual ports on the power manager. Power to a port can be turned on, turned off, or rebooted. Ports with shutdown support will automatically signal a shut down to the operating system of the attached device prior to turning off or rebooting the device.

In addition to the power manager SNMP support for the query and action type operations that allow externally originated SNMP actions to be passed to the power manager from an attached MSS1, power manager SNMP support includes power manager generated trap information. The trap information is collected at the power manager and then passed to an attached MSS1 where it is formatted for SNMP and then delivered to an external SNMP trap destination. The power manager MIB defines the trap objects that are generated by the power manager. The power manager MIB and associated SNMP definitions can be obtained directly from Server Technology via their anonymous FTP site.

The power manager SNMP trap support is designed to recognize new trap conditions and transmit messages as soon as possible. To prevent network congestion, trap conditions that remain in a steady state, e.g., in a continuing error condition, generate traps once a minute.

Traps can be transmitted when there is no active user session with the power manager Chain. This means that if a power manager chain is being used for connection via a side switch to a server and a user connections are frequent or are of long duration, traps messages will be delayed. Use of a power manager chain for trap monitoring and for frequent or long duration user sessions is possible but may not be desirable.

Multiple trap conditions may occur with a single trap message indication. For example, a trap message is sent for each change of state of a power module. If a user logs on and turns a single port on and off several times, a single trap message will be generated after a user logs off. As another example, if a temperature limit is exceeded then returns to normal and then is exceeded again during an active user session, a single trap message will be generated after a user logs off indicating the current state of the temperature trap.

There are five activities that are monitored by the power manager in order to generate SNMP traps. Each of these activities and the traps they generate are described in the sections.

Each board in a chain can have a single temperature probe that measures the current temperature at the probe in degrees Celsius. For each board high and low temperature limits can be set. When these limits are exceeded, an SNMP trap will be generated. When the temperature returns to the normal range another SNMP trap is generated, e.g., a temperature within the high and low limits as specified by a user. When the temperature first exceeds the specified limits, a trap is generated as soon as possible. Once the first trap is generated, the trap becomes a steady state trap. A new trap will be generated every one minute when a steady state temperature trap occurs until the temperature returns to the normal range and remains in the normal range for one steady state trap timer period.

For illustration, a temperature high limit is set at 100° Celsius and a low limit is set at 80° Celsius. If the temperature rises to 101°, a trap is generated and a steady state timer is set. During the steady state timer period, the temperature falls to 99° and then rises back to 100°. When the timer expires, a second temperature too trap is generated and the timer is set once again. During this timer period the temperature falls below 100° and stays there until the timer expires. When the timer expires, a temperature normal trap is generated and the timer is not set. The temperature trap is no longer in a steady state and a new trap will be generated whenever the temperature once again falls outside the limits. There are three possible temperature traps that can be generated, too high, too low, and normal range. All of the traps include the current temperature value, e.g., as sensed by the board-temperature probe.

When a user enables the Start Up Trap, the board generates an SNMP trap whenever the board is reset. Even if the trap is enabled on all boards in a chain, the first board will generate a start up trap when reset.

When a user enables the Control status Change Trap for an IPM on a board, an SNMP trap is generated whenever the control value of the IPM is changed. If multiple control status change events occur during a period when it is not possible for the power manager to send traps, a single trap will be generated indicating the last control status value.

As an example, a user has activated Control Status Change Traps for all ports on all boards in the power manager chain. A user logs on to the power manager and uses the "ON" command to turn on several ports. While a user is logged on to an active session, traps are not sent so all of the ports that were turned on have pending Control Status Change Traps. During this same session a user realizes he has made a mistake and wants to start over, so he uses the "OFF" command to turn all ports in the power manager chain off. A user then uses the "ON" command to turn on the single port he whishes to leave in the "ON" state. A user then logs off the system. After a user logs off, there will be a single SNMP trap generated for all of the ports in the system. Each trap will indicate the current control status of the port. There will be a single trap for all ports even though several of the ports have had more than one control status change.

When a user enables the Module Status Error Trap for an IPM on a board, and SNMP trap is generated whenever an error condition occurs on an IPM and another SNMP trap is generated when the error condition is ended and the IPM returns to a normal status. Like the temperature limits exceeded trap, a steady state condition timer is set after the initial trap and subsequent traps are generated on a timer expired basis until the module returns to the normal state and remains in the normal state for a timer period.

The four Module Status states that an IPM may have are, Normal is a the IPM is functioning normally; No Response is a the power manager is unable to communicate with the IPM; On Failure is a the IPM is set to ON, but there is no power on the output side of the relay; and, Off Failure is a the IPM is set to OFF, but there is power on the output side of the relay.

Each of the IPMs attached to a board may have the ability to sense the power load flowing through the IPM. For each IPM on a board high and low Device Load limits can be set. When these Device Load limits are exceeded, an SNMP trap will be generated. When the Device Load returns to the normal range (e.g., within the high and low limits as specified by a user), another SNMP trap is generated. When the Device Load first exceeds the specified limits, a trap is generated as soon as possible. Like the temperature limits exceeded trap and the Module Status Error Trap, a steady state condition timer is set after the initial trap and subsequent traps are generated on a timer expired basis until the Device Load returns to the normal state and remains in the normal state for a timer period.

There are three possible Device Load traps that can be generated, device load too high, too low, and normal range. All of traps include a current Device Load value as indicated by the IPM.

Windows-NT must be shut down prior to turning off power. When a user is at the computer, a user can manually do the necessary shutdown. However, if the Windows-NT system is used as an unattended or remote mission-critical server, no one will be present at the computer to do a shutdown prior to a remote power off or reboot action.

The power manager embodiments preferably provide a Shut Down notification for each system controlled by an individual Intelligent Power Module. When the Shut Down notification feature is installed, the power manager will automatically send a Shut Down signal to the operating system whenever an IPM is instructed to power off or reboot. A user defined "Shutdown Delay" timer decrements as the shutdown signal is asserted. This delay allows the operating system time to shut down the system in an orderly manner. When the delay time expires, power is immediately turned off. The length of the power manager "Shutdown Delay" is determined by the "Shutdown Delay" field on the power manager Power Control Screen as described earlier in this manual.

The mechanism for attaching the power manager to the Windows-NT system depends on the specific power manager hardware model a user has purchased. Please refer to the power manager Installation and Setup manual that is included with the power manager for details on connecting the power manager to the Windows-NT system.

Windows-NT provides a UPS Service to monitor a serial port for the shutdown signal, and to provide the operating system shutdown when the signal is asserted.

Configuring the Windows-NT UPS Service for use with the power manager includes setting the service to automatically startup when Windows-NT loads, and entering the proper COM port and operating parameters of the power manager. The "Services" and "UPS" icons in the Control Panel of Windows-NT are used for this. The "Expected Battery Life" must be less than the "Shutdown Delay" time configured on the power manager Power Control, otherwise, power may be turned off before the Windows-NT system has completed the shutdown.

When set for two minutes, the Windows-NT system will start to shutdown immediately when the power manager signals it to. There is no "grace" time or initial warning messages. There is a final shutdown message and then the actual shutdown. For this reason, a user may need to increase the "Expected Battery Life" on the Windows-NT UPS configuration screen and the "Shutdown Delay" on the power manager Power Control Screen. Every minute above two minutes will be time that Windows-NT will broadcast and display warning messages about the impending shutdown, before starting the final shutdown. This gives users time to finish and save their working before the shutdown occurs.

When Windows-NT boots, a user is expected to press <Ctrl><Alt><Del> to bring up a dialog box for login with user name and password. This can pose a problem for remote booting and logon since a user is not at the system to press the keys.

Fortunately, Windows-NT supports an automatic log-on feature to allow the system to automatically logon with a default user name, default password, and default domain name. Instructions for enabling this Automatic log-on feature can be obtained from Microsoft, e.g., http://www.microsoft.com/kb/articles/q97/5/97.htm, Article ID #: Q97597, Title: "How to Enable Automatic log-on in Windows-NT".

A CD ROM has been submitted with the USPTO containing additional information related to computer code that may be used in accordance with various embodiments as an MIB source-text extension that can be supplied to users to load on their power manager workstations. The CD ROM includes a file titled "program.txt" created on Jun. 21, 2013, have a file size of 16 kbytes, which is incorporated herein by reference in its entirety.

Under the DESCRIPTION section above, the second revision is described as adding high, low, and normal traps in the SNMP repertoire. The "Sentry2BoardEntry ::=SEQUENCE" paragraph has added to it the "sentry2BoardInputLoad DisplayString" entry. A current value representing the sum of all currents in a power module is enabled with a paragraph, "sentry2BoardInputLoad OBJECT-TYPE". Under the "Notifications" section, e.g., traps, the paragraph that implement the high-error, low-error, and return-to-normal are, "sentry2BoardInputLoadHighError NOTIFICATION-TYPE", "sentry2BoardInputLoadLowError NOTIFICATION-TYPE", and "sentry2BoardInputLoadNormal NOTIFICATION-TYPE".

Although the present invention has been described in terms of the present embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A system, comprising:
an electrical equipment rack;
one or more electrical loads housed in the electrical equipment rack;
a power distribution system having,
a power distribution unit enclosure comprising a long, thin, vertical plug strip housing configured to be mounted in a vertical orientation in a back portion of the electrical equipment rack, the housing defining an internal environment and an external environment, the external environment including the one or more electrical loads housed in the electrical equipment rack;
a power input penetrating the power distribution unit enclosure;
a plurality of power outputs disposed in the power distribution unit enclosure, each of the plurality of power outputs configured to be connected to a corresponding one of the one or more electrical loads;
a plurality of controllable power sections each in power controlling communication with at least one of the plurality of power outputs, and disposed in the power distribution unit enclosure, and communicably connectable to a communications network external to the power distribution unit enclosure, each of said controllable power sections configured to control power to at least one of the plurality of power outputs in response to remote monitoring of sensed environmental operating conditions;
at least one environmental operation condition sensor configured to be mounted to the power distribution unit enclosure, the at least one environmental operation condition sensor in environmental operation condition sensing communication with the external environment that includes the one or more electrical loads;
a communications bus mounted in the power distribution unit enclosure in communication with the environmental operating condition sensor and each of the controllable power sections; and
an information reporting system disposed in the power distribution unit enclosure and being (i) in environmental operation condition information-determining communication with the environmental operation condition sensor, and (ii) connectable in environmental operation condition information transfer communication with the communications network external to the power distribution unit enclosure;
wherein the controllable power section is operated to control power to at least one of the plurality of power outputs, responsive to remote monitoring of sensed environmental operation conditions.

2. An electrical power distribution system of the type being connectable to one or more electrical loads in an electrical equipment rack, the power distribution system comprising:
a power distribution unit enclosure comprising a long, thin, vertical plug strip housing configured to be mounted in a vertical orientation in a back portion of the electrical equipment rack, the housing defining an internal environment and an external environment, the external environment including the one or more electrical loads;
a power input penetrating the power distribution unit enclosure;
a plurality of power outputs disposed in the power distribution unit enclosure, each of the plurality of power outputs configured to be connected to a corresponding one of the one or more electrical loads;
a plurality of controllable power sections each in power controlling communication with at least one of the plurality of power outputs, and disposed in the power distribution unit enclosure, and communicably connectable to a communications network external to the power distribution unit enclosure, each of said controllable power sections configured to control power to at least one of the plurality of power outputs in response to remote monitoring of sensed environmental operation conditions;

at least one environmental operation condition sensor configured to be mounted to the power distribution unit enclosure, the at least one environmental operation condition sensor in environmental operation condition sensing communication with the external environment that includes the one or more electrical loads;

a communications bus mounted in the power distribution unit enclosure in communication with the environmental operating condition sensor and each of the controllable power sections; and an information reporting system disposed in the power distribution unit enclosure and being (i) in environmental operation condition information-determining communication with the environmental operation condition sensor, and (ii) connectable in environmental operation condition information transfer communication with the communications network external to the power distribution unit enclosure;

wherein the controllable power section is operaed to control power to at least one of the plurality of power outputs, responsive to remote monitoring of sensed environmental operation conditions.

3. The electrical power distribution system of claim 2, wherein the at least one environmental operation condition sensor comprises an environmental condition monitoring probe mounted to the outside of the power distribution unit enclosure.

4. The electrical power distribution system of claim 2, wherein the at least one environmental operation condition sensor comprises an environmental condition monitoring probe mounted adjacent to the power distribution unit enclosure.

5. The electrical power distribution system of claim 2, wherein the reporting system is connectable to a remote site through the communications network.

6. The electrical power distribution system of claim 2, wherein the at least one environmental operation condition sensor comprises a temperature sensor.

7. The electrical power distribution system of claim 6, wherein the temperature sensor is located adjacent the top of the electrical equipment rack.

8. The electrical power distribution system of claim 6 also comprising (i) a current sensor mounted in the power distribution unit enclosure and communicable with the information reporting system and (ii) a current display mountable in association with the enclosure in communication with the current sensor.

9. The electrical power distribution system of claim 8 also including a web interface application mounted in the power distribution unit enclosure in communication with the current sensor and the environmental operating condition sensor.

10. The electrical power distribution system of claim 8 also including a communications bus mounted in the power distribution unit enclosure in communication with the environmental operating condition sensor, the current sensor, and the controllable power section.

11. The electrical power distribution system of claim 6 also including a communications bus mounted in the power distribution unit enclosure in communication with the environmental operating condition sensor and the controllable power section.

12. The electrical power distribution system of claim 2 also comprising (i) a current sensor mounted in the power distribution unit enclosure and communicable with the information reporting system and (ii) a current display mountable in association with the enclosure in communication with the current sensor.

13. The electrical power distribution system of claim 12 also including a web interface application mounted in the power distribution unit enclosure in communication with the current sensor and the environmental operating condition sensor.

14. The electrical power distribution system of claim 12 wherein the current display comprises an alpha-numeric display on a face of the power distribution unit enclosure.

15. The electrical power distribution system of claim 14 wherein the alpha-numeric display is switchable among the power input and various ones of the power outputs.

16. The electrical power distribution system of claim 14 wherein the power outputs are disposed in the same face of the power distribution unit enclosure as the alpha-numeric display.

17. The electrical power distribution system of claim 12 wherein the current sensor is one of a plurality of current sensors each in electrical communication with one of the power outputs and with the controllable power section.

18. The electrical power distribution system of claim 2 also including a web interface application mounted in the power distribution unit enclosure in communication with the environmental operating condition sensor.

19. The electrical power distribution system of claim 2 also including a communications bus mounted in the power distribution unit enclosure in communication with the controllable power section.

20. The electrical power distribution system of claim 2 and further comprising a personality module disposed in the power distribution unit enclosure and in electrical communication with the controllable power section, the personality module comprising a microcontroller.

21. The electrical power distribution system of claim 2 wherein the controllable power section comprises one or more power control relays connected to the power input and in independent power controlling communication with one or more corresponding power outputs among the plurality of power outputs.

22. The electrical power distribution system of claim 2, further comprising a personality module disposed in the power distribution unit enclosure in communication with the communications bus, and in communication with each of the controllable power sections through the communications bus, the personality module comprising a micro controller.

* * * * *

UNITED STATES PATENT AND TRADEMARK OFFICE
CERTIFICATE OF CORRECTION

| | | |
|---|---|---|
| PATENT NO. | : 8,510,424 B2 | Page 1 of 1 |
| APPLICATION NO. | : 11/243823 | |
| DATED | : August 13, 2013 | |
| INVENTOR(S) | : Carrel W. Ewing et al. | |

It is certified that error appears in the above-identified patent and that said Letters Patent is hereby corrected as shown below:

On Title page 3, in column 1, under "Other Publications", line 7, delete "Corpration" and insert -- Corporation --, therefor.

In the Specification:

In column 10, line 2, delete "software" and insert -- software. --, therefor.

In column 16, line 10, delete "a the" and insert -- and the --, therefor.

In column 18, line 42, delete "EABLET" and insert -- ENABLET --, therefor.

In column 26, line 31, delete "SMMP" and insert -- SNMP --, therefor.

In column 36, line 14, delete "a the" and insert -- the --, therefor.

In column 36, line 15, delete "a the" and insert -- the --, therefor.

In column 36, line 16, delete "a the" and insert -- the --, therefor.

In column 36, line 17, delete "a the" and insert -- the --, therefor.

In the Claims:

In column 39, line 22, in claim 2, delete "operaed" and insert -- operated --, therefor.

Signed and Sealed this
Second Day of September, 2014

Michelle K. Lee
*Deputy Director of the United States Patent and Trademark Office*